(12) United States Patent
Bobick et al.

(10) Patent No.: US 6,535,583 B1
(45) Date of Patent: Mar. 18, 2003

(54) VOICE RECOMPRESSION METHOD AND APPARATUS

(75) Inventors: Aaron James Bobick, Calgary (CA); Brian Lawrence Buckler, Calgary (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/140,450

(22) Filed: Aug. 26, 1998

(51) Int. Cl.⁷ ................................................. H04M 1/64
(52) U.S. Cl. .................. 379/88.1; 379/67.1; 379/88.07; 379/88.16; 379/88.18; 379/88.22; 379/88.08
(58) Field of Search .......................... 379/67.1, 68, 76, 379/83, 88.04, 88.07, 88.08, 88.1, 88.14, 88.18, 88.22, 88.25, 88.26, 88.27, 88.28, 100.02, 201, 88.17, 88.16; 370/271, 465, 477, 426, 468; 704/219, 260, 500; 455/413, 415, 558, 426, 468

(56) References Cited

U.S. PATENT DOCUMENTS

| | | | | |
|---|---|---|---|---|
| 5,390,236 A | * | 2/1995 | Klausner et al. | 379/67.1 |
| 5,394,445 A | * | 2/1995 | Ball et al. | 379/67.1 |
| 5,400,393 A | * | 3/1995 | Knuth et al. | 379/88 |
| 5,483,577 A | * | 1/1996 | Gulick | 379/67.1 |
| 5,592,586 A | * | 1/1997 | Maitra et al. | 395/2.29 |
| 5,699,411 A | * | 12/1997 | Becker et al. | 379/88.22 |
| 5,732,126 A | * | 3/1998 | Fitzpatrick et al. | 379/67.1 |
| 5,828,730 A | * | 10/1998 | Zebryck et al. | 379/88.27 |
| 5,832,062 A | * | 11/1998 | Drake | 379/88.16 |
| 6,021,181 A | * | 2/2000 | Miner et al. | 379/88.23 |

* cited by examiner

Primary Examiner—Allan Hoosain
(74) Attorney, Agent, or Firm—Gibbons, Del Deo, Dolan, Griffinger & Vecchione

(57) ABSTRACT

A method and apparatus for storing a voice message. The method includes the steps of storing a coded representation of the voice message in a block of memory associated with the voice message and sized to correspond to the size of the coded representation, retrieving the coded representation to play the voice message to a user, compressing the coded representation to produce a compressed representation of the voice message, the compressed representation having a lesser size than the coded representation, after the coded representation has been retrieved, and storing the compressed representation of the message in the block of memory in place of the coded representation.

82 Claims, 38 Drawing Sheets

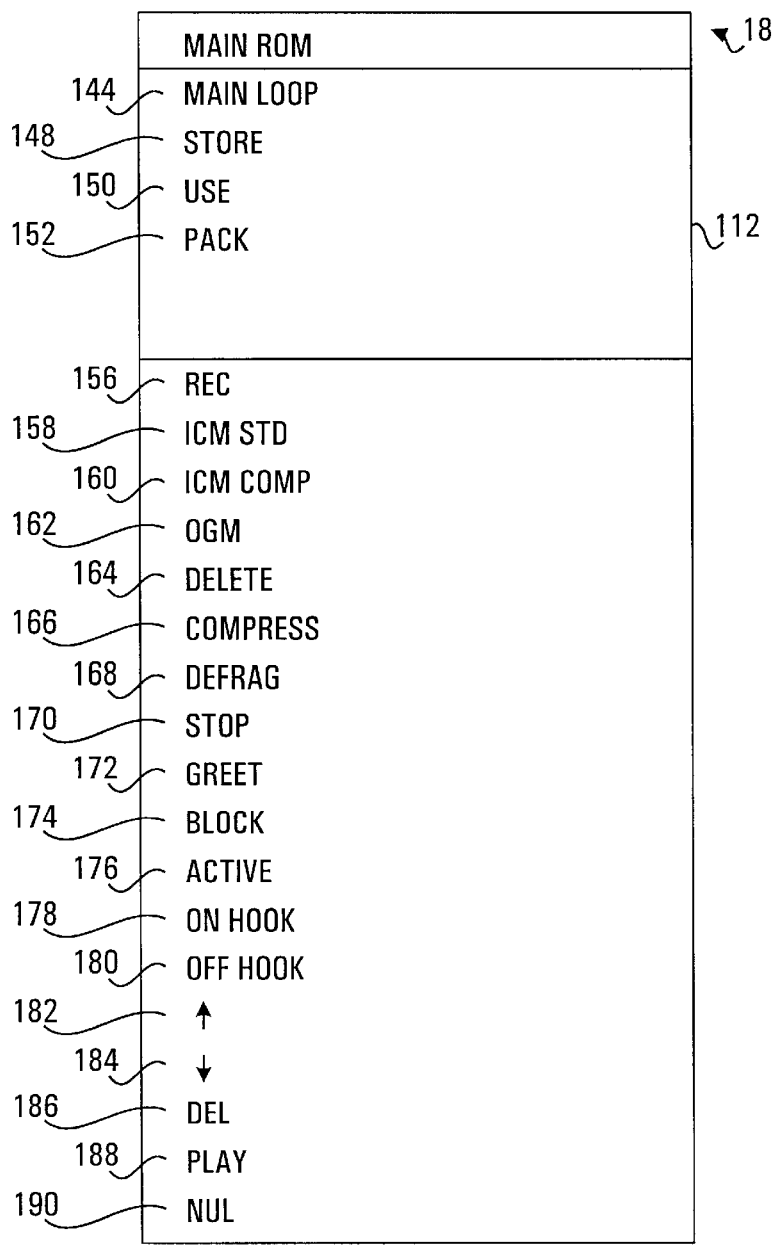

VOICE RECOMPRESSION METHOD AND APPARATUS

FIELD OF THE INVENTION

The present invention relates to a method and apparatus for storing audio messages. More particularly, it relates to digital telephone answering devices that encode messages according to the likelihood that each message will be played.

BACKGROUND OF THE INVENTION

Digital telephone answering devices (hereinafter, "DTAD"s) have finite memory circuits available for storing incoming audio messages. However, because there is no limit on the number of calls that can be transmitted to a DTAD, it is advantageous to allocate memory space wisely. To this end, a number of memory management strategies are known.

Conventionally, memory space is allocated to messages in the order in which messages are received at the DTAD. In this scheme, the amount of memory allocated to each message may be a fixed amount, an amount sufficient to store the message, or an amount sufficient to store the message subject to a ceiling limit. Typically, when the memory space has been completely allocated, no new messages can be stored and a blocking greeting informs new callers of this situation.

Although only a message recipient can determine the importance of a specific message, a more recent message is more likely to be important than is a stale one. Therefore, this conventional arrangement has a significant inherent disadvantage: the most recent messages are the most likely to be lost.

Another strategy is to use system prompts to encourage a user to wisely manage memory space. System prompts might encourage a user to listen to new messages or to delete messages he has already listened to. The disadvantage with this strategy is that it depends on the user. If a user is lax or unavailable for an extended period, then the memory space will not be managed wisely.

What is needed is an arrangement wherein a DTAD automatically manages its own memory space such that messages with a high likelihood of future play take precedence over messages with a low likelihood of future play. The present invention is directed to such an arrangement.

SUMMARY OF THE INVENTION

In accordance with one aspect of the invention, there is provided a method of storing a voice message, the method including the steps of storing a coded representation of the voice message in a block of memory associated with the voice message and sized to correspond to the size of the coded representation, retrieving the coded representation to play the voice message to a user; compressing the coded representation to produce a compressed representation of the voice message, the compressed representation having a lesser size than the coded representation, after the coded representation has been retrieved, and storing the compressed representation of the message in the block of memory in place of the coded representation.

Preferably, the method includes resizing the block of memory to approximately the size of the compressed representation.

It is desirable that the method includes the step of compressing the coded representation after a predetermined period of time after the coded representation has been retrieved. To this end, the method preferably includes the step of associating a played attribute with the voice message, the played attribute indicating whether or not the coded representation has been retrieved.

Desirably, the method includes annunciating a representation of the played attribute to the user.

Preferably the method includes the step of associating a compressed attribute with the voice message, the compressed attribute indicating whether or not the message is represented by the compressed representation. It is also desirable that the method includes the step of associating a location attribute with the voice message, the location attribute identifying the block of memory at which the coded representation or the compressed representation is stored. It is further desirable that the method includes the step of associating with the voice message a time attribute identifying a time of storing the coded representation.

It is advantageous that the method include storing a plurality of coded representations of respective voice messages in respective blocks of memory sized to correspond to respective the coded representations. Preferably, the method also includes resizing the respective blocks of memory associated with played voice messages, to approximately the sizes of respective compressed representations. It is desirable that the method include storing the plurality of coded representations in respective blocks of memory in a predefined order or even in respective contiguous blocks of memory.

Preferably, the method includes associating with each of the respective voice messages, location attributes representing the beginning point and end point of each of the respective blocks of memory. It is therefore desirable that the method provide for adjusting at least one of the location attributes after compressing an associated coded representation, to define a block of memory of reduced size.

It is advantageous that the method provide for adjusting the location attributes of blocks of memory subsequent to the block of memory of reduced size to maintain the blocks of memory contiguous.

It is also preferable that the method provide for associating with each of the respective messages a time attribute representing a time at which the coded representation is stored, a compressed attribute representing whether or not the voice message is represented by a compressed representation and a played attribute representing whether or not the coded representation has been retrieved, the played attribute being set active when the coded representation is retrieved.

Desirably, the method provides for compressing the coded representation when the played attribute is active and setting the compressed attribute active in response to compressing the coded representation.

Preferably, the method provides for setting the time attribute when the coded representation is stored. It is also desirable that the method provide for compressing when the time attribute is greater than a predefined time value, and setting the compressed attribute active in response to compressing the coded representation. It is also desirable that the method include the step of compressing when the end point of the block of memory having the greatest end point value has a value greater than a predefined end point value.

It is desirable that the method include the step of receiving the voice message from a telephone line.

In accordance with another aspect of the invention, there is provided an apparatus for storing a voice message, the apparatus including memory operable to be divided into various sized blocks, and a processor for associating a block of memory with the voice message and for storing a coded representation of the voice message in the block of memory and for sizing the block of memory to correspond to the size of the coded representation, for retrieving the coded representation to play the voice message to a user for compressing the coded representation after the coded representation has been retrieved to produce a compressed representation of the voice message, having lesser size than the coded representation, and for storing the compressed representation of the message in the block of memory in place of the coded representation.

Preferably, the processor is programmed to resize the block of memory to approximately the size of the compressed representation.

It is desirable that the processor is programmed to determine the time elapsed since the coded representation was retrieved and for actuating the compressing means after a predetermined period of time after the coded representation has been retrieved. It is also desirable that the processor is programmed to associate a played attribute with the voice message, the played attribute indicating whether or not the coded representation has been retrieved.

Preferably, the apparatus includes an annunciator for annunciating a representation of the played attribute to the user.

Desirably, the processor is programmed to associate a compressed attribute with the voice message, the compressed attribute indicating whether or not the message is represented by the compressed representation.

It is advantageous that the processor be programmed to associate a location attribute with the voice message, the location attribute identifying the block of memory at which the coded representation or the compressed representation is stored. Similarly, it is desirable that the processor is programmed to associate with the voice message a time attribute identifying a time of storing the coded representation.

Preferably, the processor is programmed to store a plurality of coded representations of respective voice messages in respective blocks of memory and to size the blocks of memory to correspond to respective the coded representations. It is similarly preferable that the processor is programmed to resize the respective blocks of memory associated with played voice messages, to approximately the respective sizes of respective compressed representations.

Desirably, the processor is programmed to store the plurality of coded representations in respective blocks of memory in a predefined order or in respective contiguous blocks of memory.

Desirably, the processor is programmed to store a location attribute associator for associating with each of the respective voice messages, location attributes representing the beginning point and end point of each of the respective blocks of memory. Preferably, the processor is programmed to adjust at least one of the location attributes after compressing an associated coded representation, to define a block of memory of reduced size. It is also advantageous that the processor be programmed to adjust the location attributes of blocks of memory subsequent to the block of memory of reduced size to maintain the blocks of memory contiguous.

Preferably, the processor is programmed to associate with each of the respective messages a time attribute representing a time at which the coded representation is stored, a compressed attribute representing whether or not the voice message is represented by a compressed representation and a played attribute representing whether or not the coded representation has been retrieved. It is desirable that the processor be programmed to set the played attribute active when the coded representation is retrieved.

Desirably, the processor is programmed to compress the coded representation when the played attribute is active and to set the compressed attribute active after compressing the coded representation.

It is also preferable that the processor be programmed to set the time attribute when the coded representation is stored and to adjust the time attribute to reflect time elapsed since the coded response was stored. It is desirable that the processor be programmed to compress the coded representation when the time attribute is greater than a predefined time value, and to set the compressed attribute active after compressing.

Preferably, the processor is programmed to compress the coded representation when the end point of the block of memory having the greatest end point value has a value greater than a predefined end point value.

It is desirable that, the apparatus includes a receiver for receiving the voice message from a telephone line and for providing the voice message to the processor.

In accordance with yet another aspect of the invention, there is provided an apparatus for storing a voice message, the apparatus including memory operable to be divided into variable sized blocks, provisions for associating a block of memory with the voice message and for storing a coded representation of the voice message in the block of memory and for sizing the block of memory to correspond to the size of the coded representation, provisions for retrieving the coded representation to play the voice message to a user, provisions for compressing the coded representation after the coded representation has been retrieved to produce a compressed representation of the voice message, the compressed representation having lesser size than the coded representation, and provisions for storing the compressed representation of the message in the block of memory in place of the coded representation.

In accordance with still another aspect of the invention, there is provided a processor readable storage medium on which is stored a plurality of processor readable codes for directing a processor to store a voice message by storing a coded representation of the voice message in a block of memory associated with the voice message and sized to correspond to the size of the coded representation, retrieving the coded representation to play the voice message to a user, compressing the coded representation to produce a compressed representation of the voice message, the compressed representation having a lesser size than the coded representation, after the coded representation has been retrieved and storing the compressed representation of the message in the block of memory in place of the coded representation.

Effectively, the invention provides a way of storing a coded representation of a voice message in a block of memory associated with the voice message and sized to correspond to the size of the coded representation. The invention provides for retrieving the coded representation to play the voice message to a user and for compressing the coded representation after it has been retrieved so as to produce a compressed representation having a lesser size than the coded representation. The invention then provides for storing the compressed representation of the message in a smaller block of memory in place of the coded representation.

BRIEF DESCRIPTION OF THE DRAWINGS

In drawings which illustrate embodiments of the invention,

FIG. 3 is a memory structure diagram of a section of a random access memory ("main RAM") associated with the microprocessor.

FIG. 4 is a memory structure diagram of a section of a read only memory ("main ROM") associated with the microprocessor.

DETAILED DESCRIPTION

Figure 1:
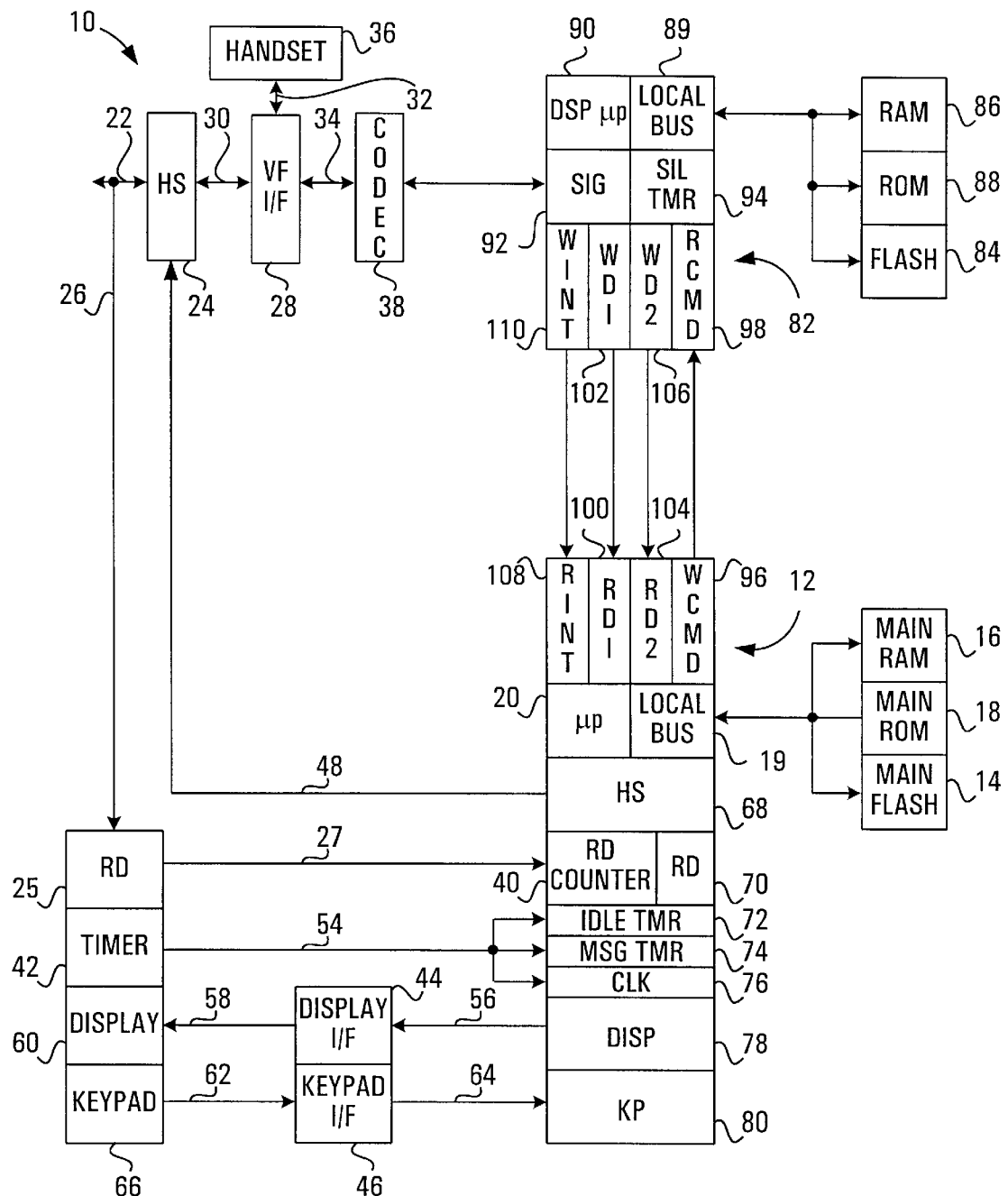
FIG. 1 is a block diagram of a digital telephone answering device ("DTAD") according to a first embodiment of the invention, the DTAD having both a microprocessor and a digital signal processor ("DSP").

Referring to FIG. 1, an apparatus for storing a voice message, according to one aspect of the invention, is illustrated in block diagram form. The apparatus includes a customer premises equipment (CPE) circuit generally illustrated at 10.

The CPE circuit 10 includes a microprocessor circuit ("main microprocessor circuit") generally illustrated at 12. The main microprocessor circuit 12 is in communication with memory devices including non-volatile memory ("main FLASH") 14, random access memory ("main RAM") 16, and read-only memory ("main ROM") 18. Conventional address, data and control signal lines forming a main local bus 19 are used by the main microprocessor circuit 12 to read from each of the memory devices and to write to the main FLASH 14 and the main RAM 16.

In this embodiment, the main microprocessor circuit 12 includes a main microprocessor 20 and various other conventional microprocessor circuit components including signal buffers and the like as will be appreciated by those skilled in the art, rendering the main microprocessor 20 operable to communicate with the main FLASH 14, the main RAM 16 and the main ROM 18. Generally the main microprocessor circuit 12 establishes an address space with the main FLASH 14, the main RAM 16 and the main ROM 18 mapped to respective areas of the address space.

The CPE circuit 10 further includes a telephone line terminal 22 for connection to the public switched telephone network (not shown). A hook-switch 24 is connected to the line terminal 22. The hook-switch 24 can assume either an on-hook state or an off-hook state.

The hook-switch 24 has a control signal input 48 connected to the main microprocessor circuit 12. In response to an active digital signal on its control signal input 48, the hook-switch 24 assumes an off-hook state. In the absence of such an active signal, the hook-switch 24 assumes an on-hook state.

A ring detector 25 has a signal input 26 and a signal output 27. The ring detector 25 is connected to the line terminal 22 by its signal input 26. In response to a central office ring signal detected at its signal input 26, the ring detector 25 generates a digital active signal at its signal output 27. The signal output 27 of the ring detector 25 connects to the main microprocessor circuit 12.

A voice frequency interface circuit 28 has a line-side terminal 30, a handset terminal 32, and a telephone answering device (TAD) terminal 34. The voice frequency interface circuit 28 connects to the hook-switch 24 at its line-side terminal 30. A handset 36 connects to the voice frequency interface circuit 28 at its handset terminal 32. A CODEC 38 connects to the voice frequency interface circuit 28 at its TAD terminal 34.

The main microprocessor circuit 12 is in communication with a plurality of interface components including the hook-switch 24, the ring detector 25, a timer 42, a visual display interface 44, and a keypad interface 46.

The timer 42 has a timer output 54. The timer 42 generates a periodic synchronization signal every second. This synchronization signal takes the form of an active digital pulse at the timer output 54. The timer output 54 connects to the main microprocessor circuit 12.

The display interface 44 has a display interface input 56 and a display interface output 58. The display interface input 56 is connected to the main microprocessor circuit 12 and the display interface output 58 is connected to a visual display 60, which in this embodiment is a liquid crystal display. In response to signals received from the main microprocessor circuit 12, the display interface 44 provides signals to the visual display 60 to cause an image to appear on the visual display 60.

The keypad interface 46 has a keypad interface input 62 and a keypad interface output 64. The keypad interface output 64 is connected to the main microprocessor circuit 12 and the keypad interface input 62 is connected to a keypad 66. In response to distinct keypress actions at the keypad 66, the keypad interface 46 generates distinct signals at the keypad interface output 64.

The main microprocessor circuit 12 includes a plurality of interface circuits, some of which may be located on the main microprocessor 20 and some of which may be remote from the main microprocessor 20. These interface circuits establish a plurality of I/O ports within a designated address space through which communications between the main microprocessor circuit 12 and the various components described above are conducted. Such communications are conducted by writing to or reading from ports associated with a given interface or component described above.

In this embodiment, the interface circuits include an HS port 68, an RD COUNTER port 40, an IDLE TMR register 72, an MSG TMR register 74, a CLK register 76, a DISP port 78, and a KP port 80.

The HS port 68 is a bit-wide register writable by the main microprocessor circuit 12. The HS port 68 is connected to the hook-switch control signal input 48 and thereby sets the state of the hook-switch 24.

The RD COUNTER port 40 is a multi-bit register readable by the main microprocessor circuit 12. The RD COUNTER port 40 is connected to the signal output 27 of the ring detector 25 such that the value stored in the RD COUNTER port 40 is incremented with each active signal received from the ring detector 25.

Pursuant to techniques well known in the art, an RD register 70 is set active only when a predetermined number of ring detect signals are received at the CPE circuit 10 within a predetermined interval. The main microprocessor circuit 12 initializes a countdown timer (not shown) to the predefined interval when the value stored in the RD COUNTER port 40 becomes "1". If the value stored in the RD COUNTER port 40 becomes greater than or equal to the predetermined number of ring detect signals before the countdown timer expires, then the main microprocessor circuit 12 sets the RD register 70 active. If the value stored in the RD COUNTER port 40 is less than the predetermined number of ring detect signals when the countdown timer expires, then the main microprocessor circuit 12 sets the RD register 70 inactive, and clears the RD COUNTER port 40.

The IDLE TMR register 72 is a multi-bit register synchronized to the timer 42 through the timer output 54. The value stored in the IDLE TMR register 72 is incremented with each active signal pulse on the timer output 54. The IDLE TMR register 72 is both readable and resettable by the main microprocessor circuit 12.

The MSG TMR register 74 is a multi-bit register synchronized to the timer 42 through the timer output 54. The value stored in the MSG TMR register 74 is incremented with each active signal pulse on the timer output 54. The MSG TMR register 74 is both readable and resettable by the main microprocessor circuit 12.

The CLK register 76 is a multi-bit register synchronized to the timer 42 through the timer output 54. The CLK register 76 is readable by the microprocessor and is configured to provide both time and date information.

The DISP port 78 is a multi-byte port writable by the main microprocessor circuit 12 to present image display data to the display interface 44.

The KP port 80 is a multi-byte port readable by the main microprocessor circuit 12. The port data is provided by the keypad interface 46 and identifies the key most recently pressed on the keypad 66.

The CPE circuit 10 further includes a digital signal processor circuit (DSP) generally illustrated at 82. The DSP circuit 82 is in communication with memory devices including non-volatile memory ("DSP FLASH") 84, random access memory ("DSP RAM") 86, and read-only memory ("DSP ROM") 88. Conventional address, data and control signal lines forming a DSP local bus 89 are used by the DSP circuit 82 to read from each of the memory devices and to write to the DSP FLASH 84 and the DSP RAM 86.

In this embodiment, the DSP circuit 82 includes a DSP microprocessor 90 and various other conventional DSP circuit components including signal buffers and the like as will be appreciated by those skilled in the art, rendering the DSP microprocessor 90 operable to communicate with the DSP FLASH 84, the DSP RAM 86 and the DSP ROM 88. Generally the DSP circuit 82 establishes an address space with the DSP FLASH 84, the DSP RAM 86 and the DSP ROM 88 mapped to respective areas of the address space.

The DSP circuit 82 further includes a signal buffer ("SIG buffer") 92, so arranged as to hold a substantial sequence of digital signal samples pending processing. It will be appreciated that the SIG buffer 92 may not be large enough to store a whole signal being processed. Therefore the DSP circuit 82 cooperates with the DSP FLASH 84 and the DSP RAM 86 to virtualize the SIG buffer 92 so that it appears sufficiently large to store the whole signal being processed. This virtualization is conventional and transparent and will not be discussed further.

The SIG buffer 92 is connected to read from and write to the CODEC 38. Therefore, the SIG buffer 92 is connected through the voice frequency interface circuit 28 to transmit signals to and receive signals from the handset 36 and the public switched telephone network through the line terminal 22. Thus the voice frequency interface circuit acts as a receiver or means for receiving a voice message from a telephone line and for providing the voice message to a processor.

The DSP circuit 82 further includes an internal timer circuit ("SIL TMR") 94. When the DSP circuit 82 is processing a signal, the timer circuit SIL TMR 94 resets whenever the signal energy rises above a low predetermined threshold. In this manner, the timer circuit SIL TMR 94 measures the duration of low energy or silence signals. The main microprocessor circuit 12 and the DSP circuit 82 are connected in a master/slave configuration and have four paired interface circuits.

First, the main microprocessor circuit 12 has a writable command WCMD port 96 and the DSP circuit 82 has a readable command RCMD port 98. The WCMD port 96 is connected to the RCMD port 98. The WCMD port 96 and the RCMD port 98 are multi-bit ports configured to pass signals representing an instruction and associated parameter data.

Second, the main microprocessor circuit 12 has a readable first data RD1 port 100 and the DSP circuit 82 has a writable first data WD1 port 102. The RD1 port 100 is connected to the WD1 port 102. The RD1 port 100 and the WD1 port 102 are multi-bit ports configured to pass signals to the main microprocessor circuit 12 representing status data associated with the DSP circuit 82.

Third, the main microprocessor circuit 12 has a readable second data RD2 port 104 and the DSP circuit 82 has a writable second data WD2 port 106. The RD2 port 104 is connected to the WD2 port 106. The RD2 port 104 and the WD1 port 106 are multi-bit ports configured to pass signals to the main microprocessor circuit 12 representing status data associated with the DSP circuit 82.

Fourth, the main microprocessor circuit 12 has an interrupt receive RINT port 108 and the DSP circuit 82 has a writable interrupt WINT port 110. The RINT port 108 is connected to the WINT port 110. The RINT port 108 and the WINT port 110 are single-bit ports configured such that a digital active state at the WINT port 110 causes a digital active state representing an interrupt request at the RINT port 108.

Figure 2:
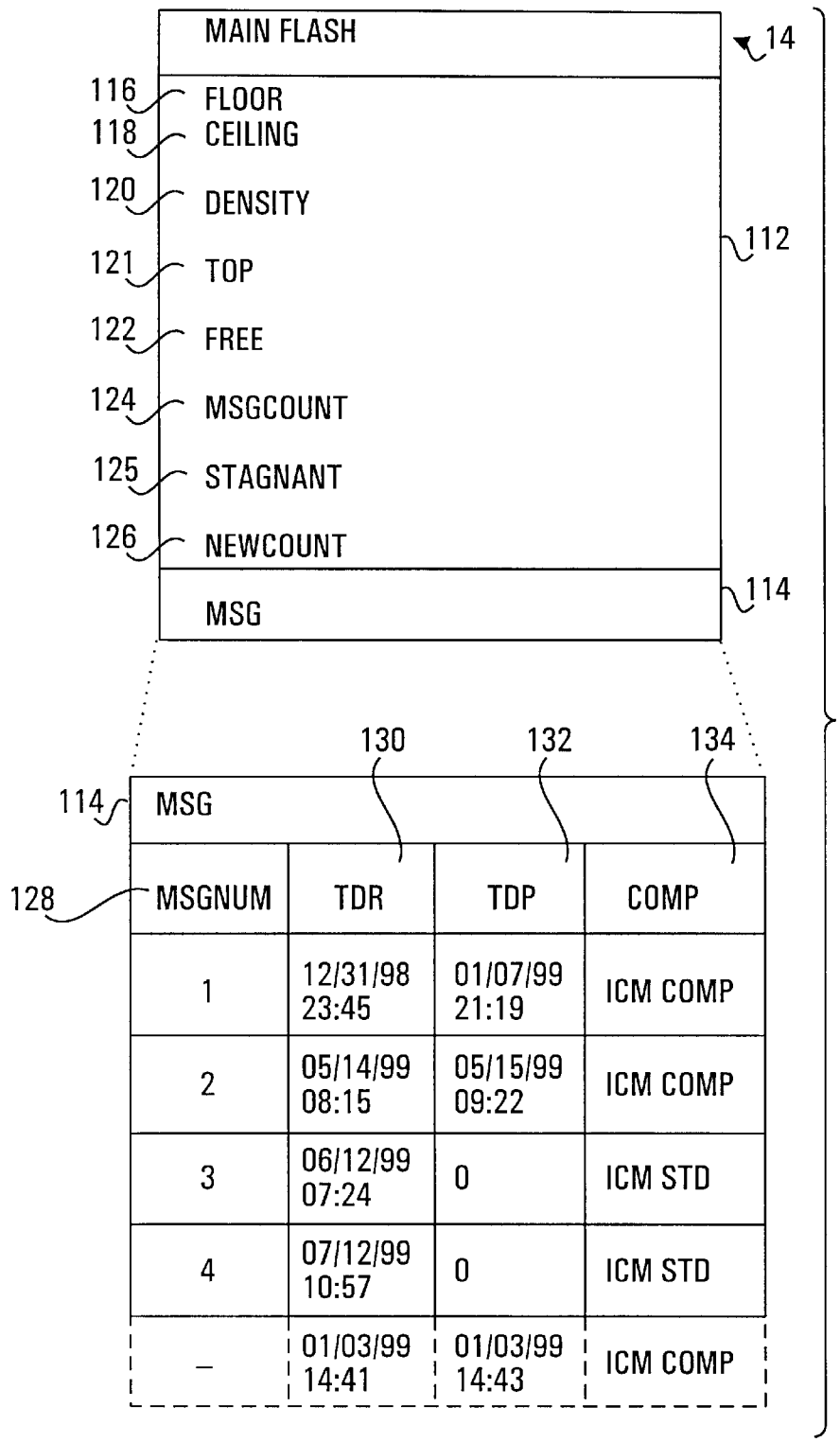
FIG. 2 is a memory structure diagram of a section of a non-volatile memory ("main FLASH") associated with the microprocessor.

With reference now to FIG. 2, the main FLASH 14 is configured to include a plurality of single element storage buffers 112 and a multiple element storage buffer MSG 114 arranged as an array.

The single element storage buffers 112 include a FLOOR buffer 116, a CEILING buffer 118, a DENSITY buffer 120, a TOP buffer 121, a FREE buffer 122, a STAGNANT buffer 125, a main MSGCOUNT buffer 124, and a NEWCOUNT buffer 126.

The FLOOR buffer 116 and CEILING buffer 118 are loaded with codes representing respectively a minimum and a maximum message time that will be stored by the CPE circuit 10 circuit. The DENSITY buffer 120 is loaded with codes representing the ratio between message duration and the. amount of memory needed to store the message.

The TOP buffer 121 is loaded with codes representing a last memory address in a portion of the DSP FLASH 84 that has been allocated to store messages. In this embodiment, the first memory address in the portion of the DSP FLASH 84 allocated to store messages is "0000".

The FREE buffer 122 is loaded with codes representing the amount of free memory available in the portion of the DSP FLASH 84 allocated to store messages.

The STAGNANT buffer 125 is loaded with codes representing a time interval. In this embodiment, the STAGNANT buffer 125 is loaded with a value representing a time interval measured from a message's first playback time, after which the message will be considered stagnant and therefore appropriate for compression.

The main MSGCOUNT buffer 124 is loaded with codes representing the number of messages currently stored by the CPE circuit 10 while the NEWCOUNT buffer 126 may be loaded with codes representing the number of unplayed messages stored by the CPE circuit 10.

The main MSG buffer 114 is a two dimensional array with individually addressable elements. The main MSG buffer 114 is loaded with codes representing records associated with individual messages stored by the CPE circuit 10. The first array dimension therefore corresponds to individual records 128 while the second array dimension corresponds to record fields or array elements in each of the records 128, including a "time and date recorded" TDR element 130, a "time and date played" TDP element 132, and a "compression status" COMP element 134.

Thus, the main microprocessor 20, as programmed by the codes stored in the main ROM 18, acts as associating means for associating and a processor programmed to associate with each of the respective messages a time attribute representing a time at which the coded representation is stored, a compressed attribute representing whether or not the voice message is represented by a compressed representation and a played attribute representing whether or not the coded representation has been retrieved.

Referring now to FIG. 3, the main RAM 16 is configured to include a MSGLIM buffer 136, a main MSGNUM buffer 138, and a LOOP buffer 140.

The MSGLIM buffer 136 is loaded with codes representing the duration after which an incoming message will no longer be recorded. The main MSGNUM buffer 138 is loaded with codes representing a current record in the main MSG buffer 114. The LOOP buffer 140 is loaded with codes representing a loop counter.

Referring now to FIG. 4, the main ROM 18 is programmed with sets of codes readable by the main microprocessor 20. The sets of codes define respective routines for directing the microprocessor to interact with the I/O ports to establish certain functionality according to conventional algorithms and according to new algorithms described herein. New algorithms according to this embodiment of the invention are implemented by routines including a STORE subroutine 148, a USE subroutine 150, and a PACK subroutine 152.

The main ROM 18 is further configured to include a set of mnemonic constants 154 that represent codes for decoding signals from the KP port 80, the RD1 port 100, the RD2 port 104, and the RINT port 108 and for encoding signals to the WCMD port 96 that will be understood by the DSP circuit 82 and the HS port 68 that will be understood by the hook-switch 24.

Those mnemonic constants 154 for instructing the DSP include: REC 156 for requesting a DSP record operation, ICMSTD 158 for requesting a DSP uncompressed playback operation, ICMCOMP 160 for requesting a DSP compressed playback operation, OGM 162 for requesting a DSP greeting message playback operation, DELETE 164 for requesting a DSP message deletion operation, COMPRESS 166 for requesting a DSP message compression operation, DEFRAG 168 for requesting a DSP memory defragmentation operation, STOP 170 for requesting a DSP stop recording operation, GREET 172 for specifying a DSP "leave message" greeting message, and BLOCK 174 for specifying a DSP "memory full" greeting message.

The mnemonic constant ACTIVE 176 represents the active state of the RINT 108 port or the RD register 70.

The mnemonic constants ONHOOK 178 and OFFHOOK 180 represent inactive and active signal levels on the control signal input 48 of the hook-switch 24.

The mnemonic constants UPARROW 182, DOWNARROW 184, DEL 186, and PLAY 188 correspond to specific keypress activities at the keypad 66. The mnemonic constant NUL 190 corresponds to an absence of keypress activity at the keypad 66.

Figure 5:
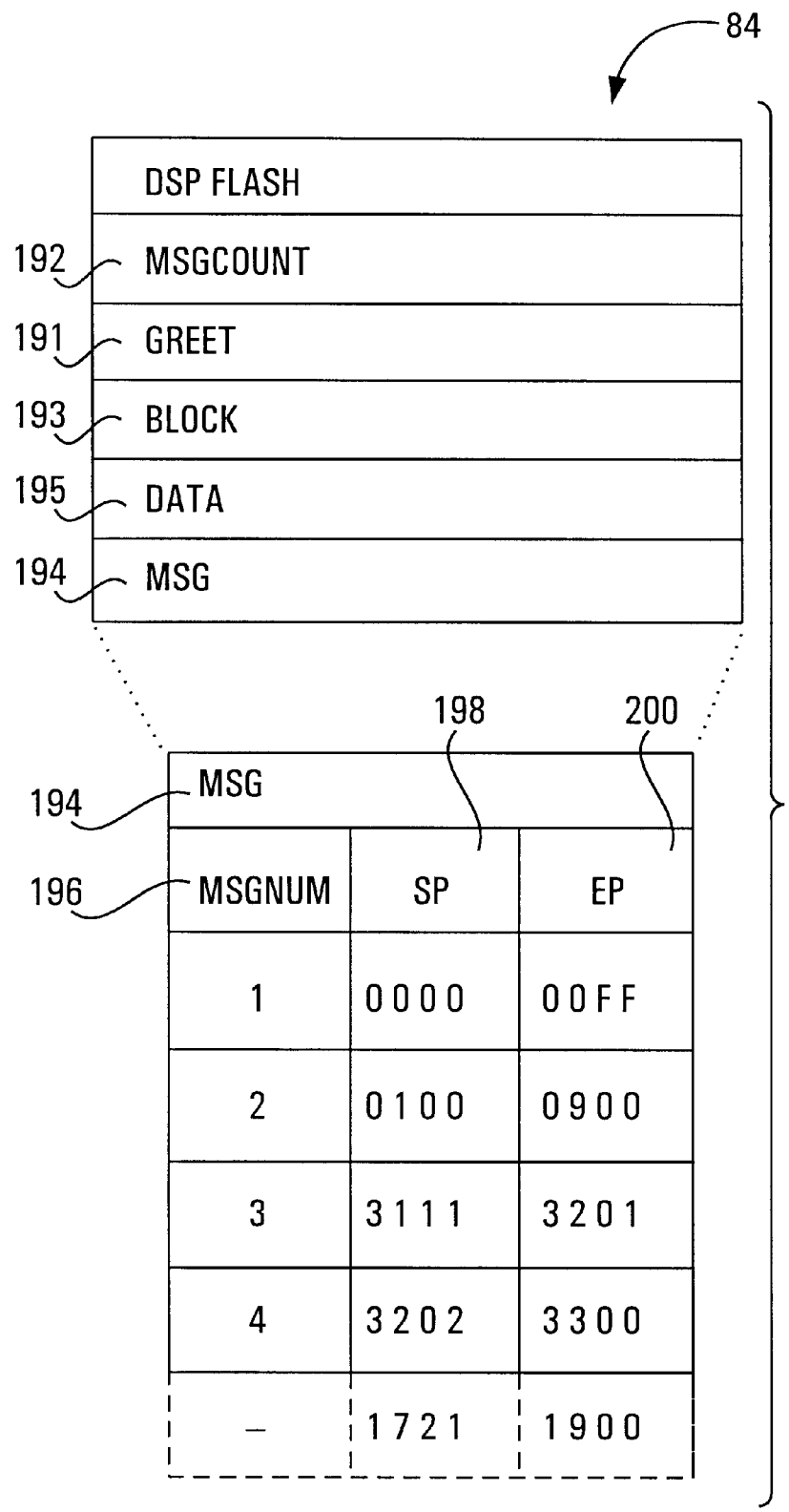
FIG. 5 is a memory structure diagram of a section of a non-volatile memory ("DSP FLASH") associated with the DSP.

Referring now to FIG. 5, the DSP FLASH 84 is configured to include a single element DSP MSGCOUNT buffer 192, a multiple element DSP MSG buffer 194 arranged as an array, a contiguous DATA buffer 195, a contiguous GREET buffer 191, and a contiguous BLOCK buffer 193.

The DSP MSGCOUNT buffer 192 may be loaded with codes representing the number of messages currently stored by the CPE circuit 10.

The DSP MSG buffer 194 is a two dimensional array with individually addressable elements. The DSP MSG buffer 194 may be loaded with codes representing records associated with individual messages stored by the CPE circuit 10. The first array dimension therefore corresponds to individual records 196 while the second array dimension corresponds to record fields or array elements, including a memory start pointer SP element 198 and a memory end pointer EP element 200.

Thus, the DSP microprocessor 90, as programmed by the codes stored in DSP ROM 88, acts as associating means for associating with each of the respective voice messages, and as a processor programmed to store a location attribute associator for associating with each of the respective voice messages, location attributes representing the beginning point and the end point of each of the respective blocks of memory.

The DATA buffer 195 includes a contiguous memory space that may be loaded with codes representing sampled audio signal levels as processed by the DSP microprocessor 90. In this embodiment, messages are stored in the DATA buffer 195, each message having an associated memory start pointer SP element 198 and a memory end pointer EP element 200 pointing into the DATA buffer 195 to delimit the message. Therefore, the DATA buffer 195 acts as memory operable to be divided into various sized blocks.

The GREET buffer 191 is a contiguous memory space that may be loaded with codes representing sampled audio signal levels as processed by the DSP microprocessor 90 that when reconstructed produce a human-intelligible message asking a caller to the CPE circuit 10 to please leave a message.

The BLOCK buffer 193 is a contiguous memory space that may be loaded with codes representing sampled audio signal levels a processed by the DSP microprocessor 90 that when reconstructed produce a human-intelligible message informing a caller to the CPE circuit 10 that message memory is currently exhausted and the caller should call back later.

Figure 6:
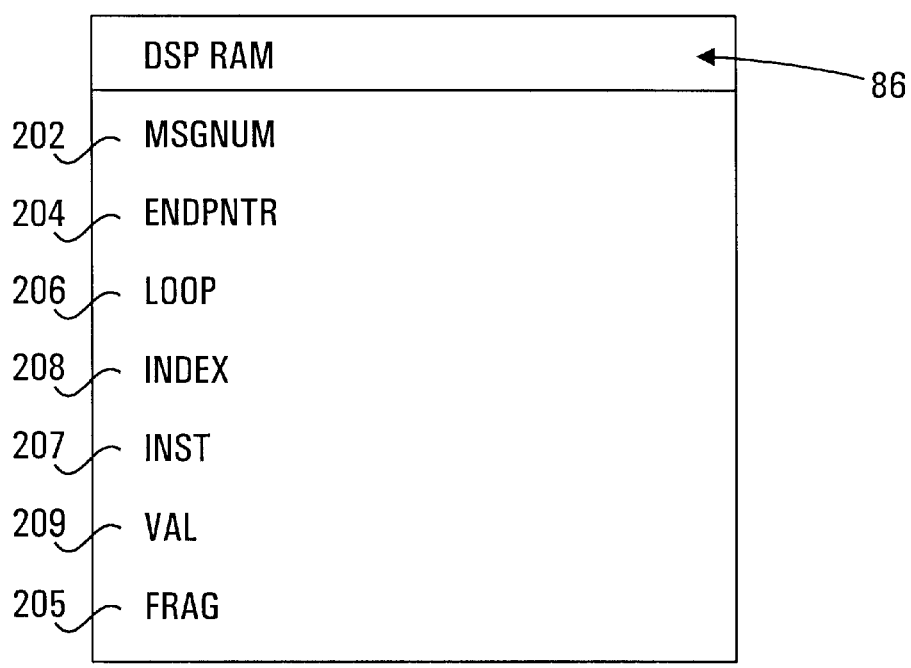
FIG. 6 is a memory structure diagram of a section of a random access memory ("DSP RAM") associated with the DSP.

Referring to FIG. 6, the DSP RAM 86 is configured to include a DSP MSGNUM buffer 202, a ENDPNTR buffer 204, a LOOP buffer 206, an INDEX buffer 208, an INST buffer 207, a VAL buffer 209, and a FRAG buffer 205.

The DSP MSGNUM buffer 202 is loaded with codes representing a current record in the DSP MSG buffer 194.

The ENDPNTR buffer 204 is loaded with codes representing a pointer to an address location within the SIG buffer 92.

The LOOP buffer 206 and the INDEX buffer 208 is loaded with codes representing loop counters.

The INST buffer 207 and the VAL buffer 209 is loaded with codes representing respectively instructions and parameter values passed from the WCMD port 96 to the RCMD port 98.

The FRAG buffer 205 is loaded with codes representing the fragmented memory space between messages stored in the DSP DATA buffer 195.

Figure 7:
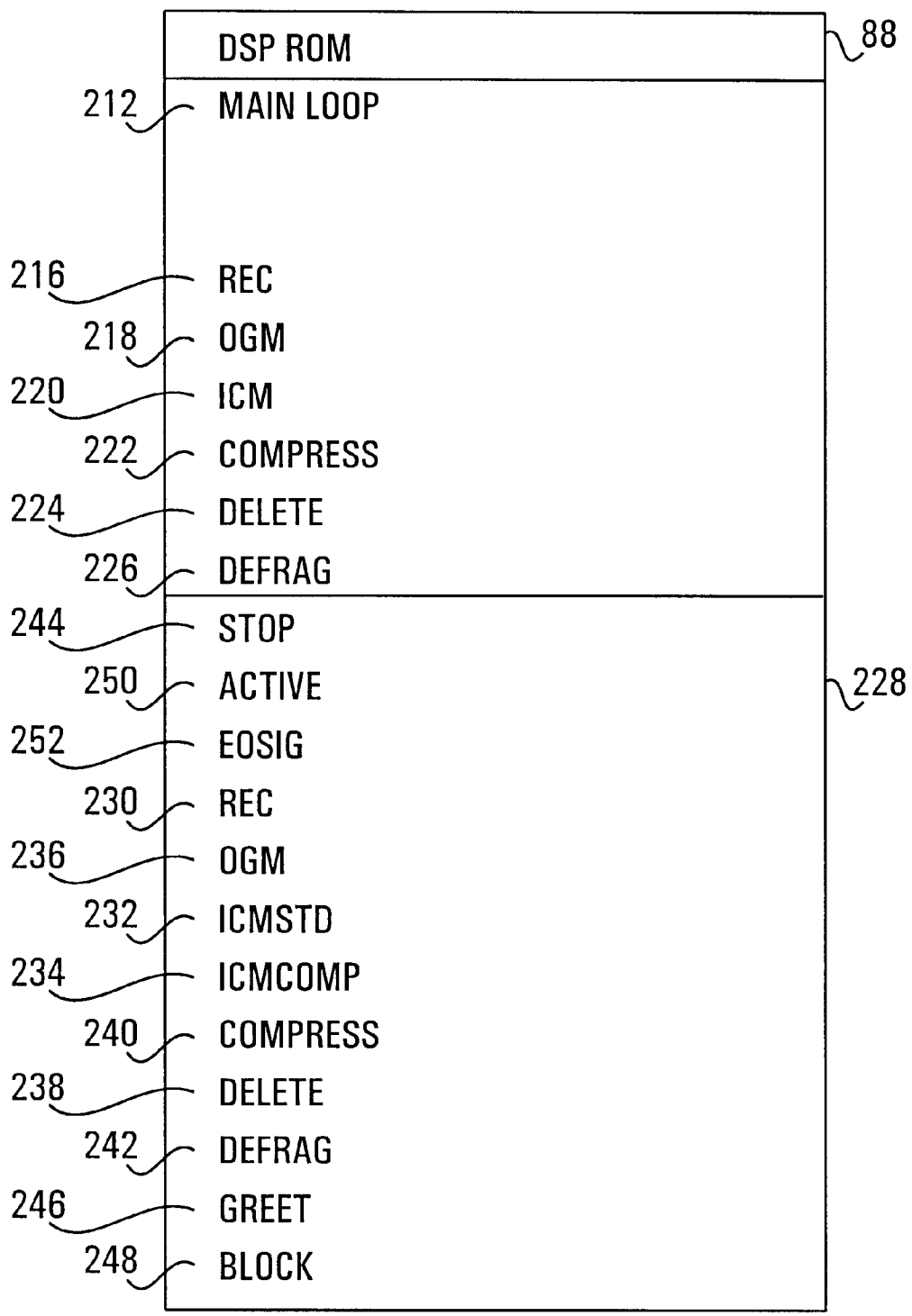
FIG. 7 is a memory structure diagram of a section of a read only memory ("DSP ROM") associated with the DSP.

Referring now to FIG. 7, the DSP ROM 88 is programmed with sets of codes readable by the DSP microprocessor 90. The sets of codes define respective routines for directing the DSP microprocessor 90 to interact with the I/O ports to establish certain functionality according to conventional algorithms and according to new algorithms described herein. New algorithms according to this embodiment of the invention are implemented by routines including a REC subroutine 216, an OGM subroutine 218, an ICM subroutine 220, a COMPRESS subroutine 222, a DELETE subroutine 224, and a DEFRAG subroutine 226.

The DSP ROM 88 is further configured to include a set of mnemonic constants 228 that represent codes for decoding signals from the RCMD port 98, and the SIG buffer 92, and for encoding signals to the WINT port 110 that will be understood by the main microprocessor circuit 12.

Those mnemonic constants 228 for decoding signals from the RCMD port 98 include: REC 230 for requesting a DSP record operation, ICMSTD 232 for requesting a DSP uncompressed playback operation, ICMCOMP 234 for requesting a DSP compressed playback operation, OGM 236 for requesting a DSP greeting message playback operation, DELETE 238 for requesting a DSP message deletion operation, COMPRESS 240 for requesting a DSP message compression operation, DEFRAG 242 for requesting a DSP memory defragmentation operation, STOP 244 for a DSP stop recording operation, GREET 246 for specifying a DSP "leave message" greeting message, and BLOCK 248 for specifying a DSP "memory full" greeting message.

The mnemonic constant ACTIVE 250 represents the active state of the WINT 110 port which corresponds to an interrupt being issued to the main microprocessor 20 through the RINT port 108.

The mnemonic constant EOSIG 252 represents an "end of memory" delimiter. It has a value that represents the end of the memory space of the SIG buffer 92.

Operation

Figure 8:
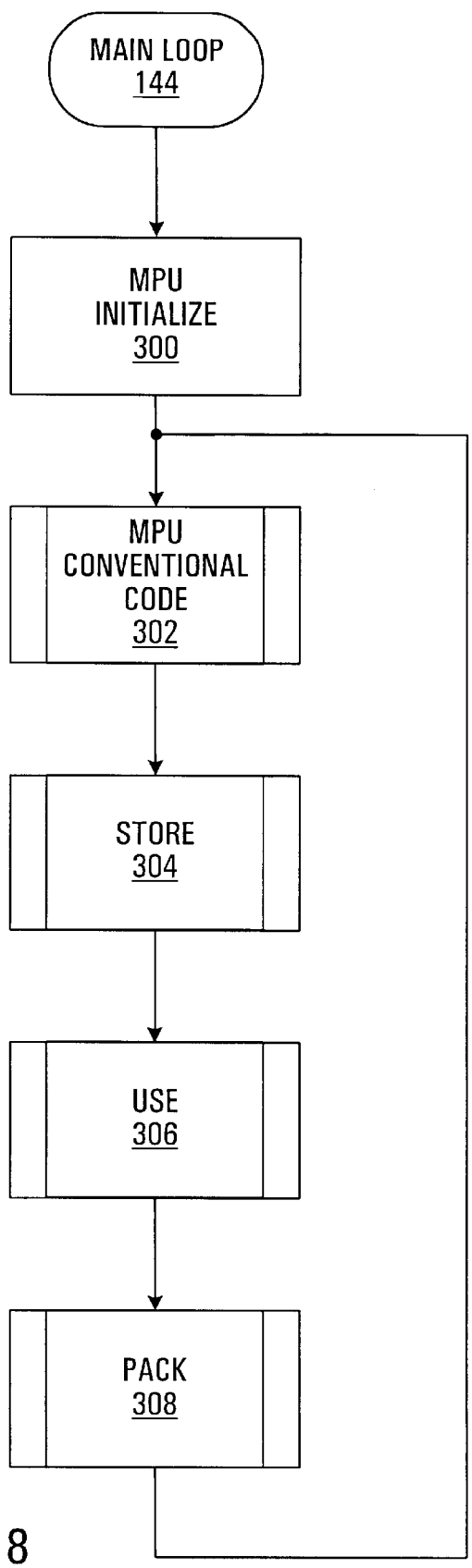
FIG. 8 is a flowchart diagram of a MAIN LOOP routine stored in the main ROM for programming the microprocessor.

Referring now to FIG. 8, the operation of this embodiment of the invention will now be discussed.

MPU MAIN LOOP

The microprocessor MAIN LOOP 144 begins with block 300 which directs the main microprocessor 20 to initialize the main FLASH 14 and main RAM 16. This block 300 is only executed when the CPE circuit 10 is first activated or in the event that it has to be reset.

At such initialization, the FLOOR buffer 116, the CEILING buffer 118, the DENSITY buffer 120, and the TOP buffer 121 are loaded with codes representing values related to the amount of DSP FLASH 84 available to store messages and the sampling rate of the DSP circuit 82.

The FREE buffer 122 is loaded with codes representing the product of the values stored in the DENSITY buffer 120 and the TOP buffer 121. This value sets the available message recording time.

The main MSGCOUNT buffer 124 and the NEWCOUNT buffer 126 are loaded with codes representing the value zero. The main MSG buffer 114 may be loaded with codes representing null values but this step is not necessary as the buffer is dynamically allocated.

All of the buffers in the main RAM 16 are loaded with codes representing the value zero.

Block 302 then directs the main microprocessor 20 to execute conventional code not the subject of the present invention.

Block 304 directs the main microprocessor 20 to execute the STORE subroutine 148 to store any new incoming message.

Block 306 directs the main microprocessor 20 to execute the USE subroutine 150 to access any message stored by the CPE circuit 10.

Block 308 directs the main microprocessor 20 to execute the PACK subroutine 152 to optimize the allocation of the DSP FLASH 84 used to store messages by the CPE circuit 10.

The main microprocessor 20 is then directed back to block 302 to once again execute the conventional code.

DSP MAIN LOOP

Figure 9A:
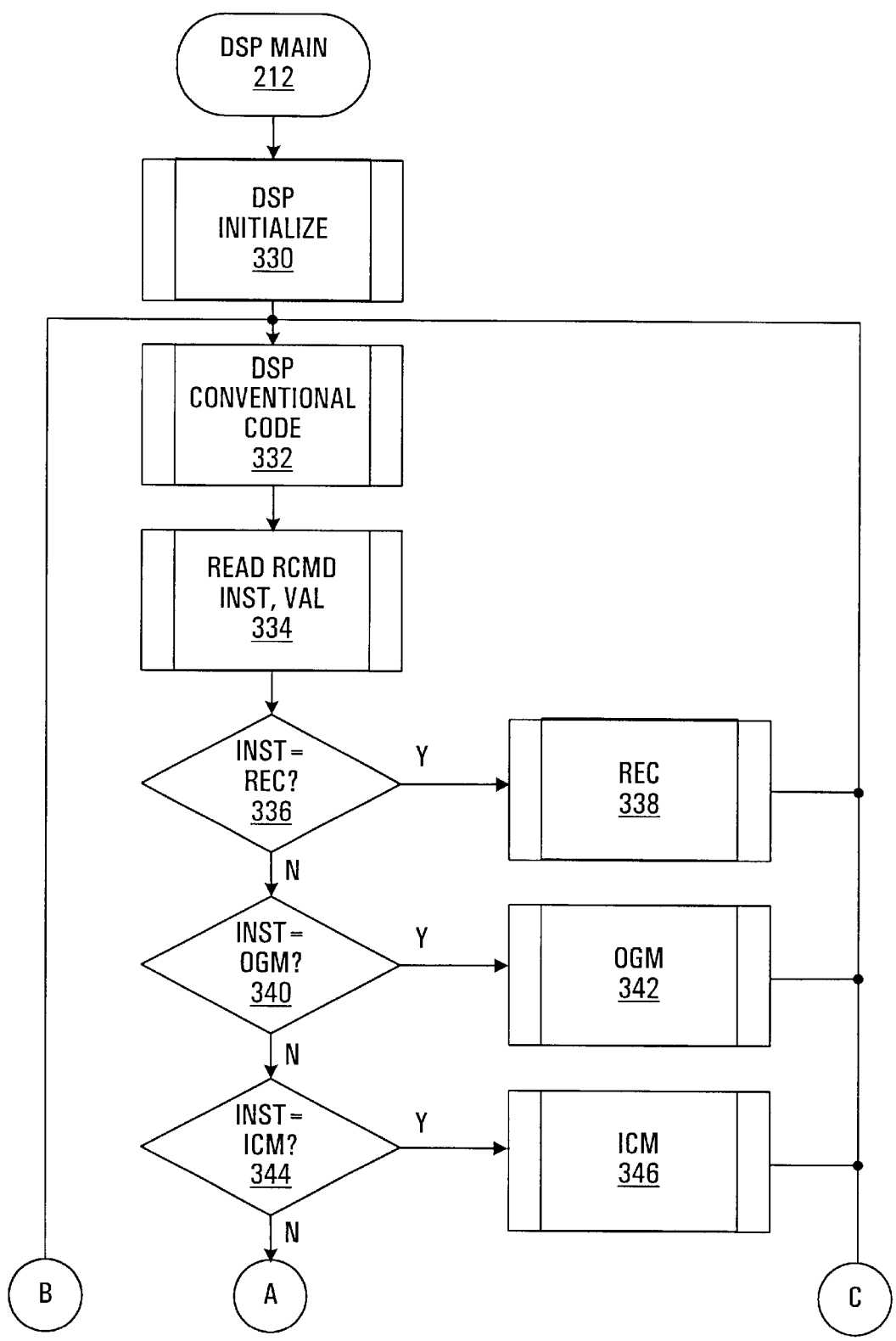
FIGS. 9a–9b are flowcharts describing a MAIN LOOP routine stored in the DSP ROM for programming the DSP.
Figure 9B:
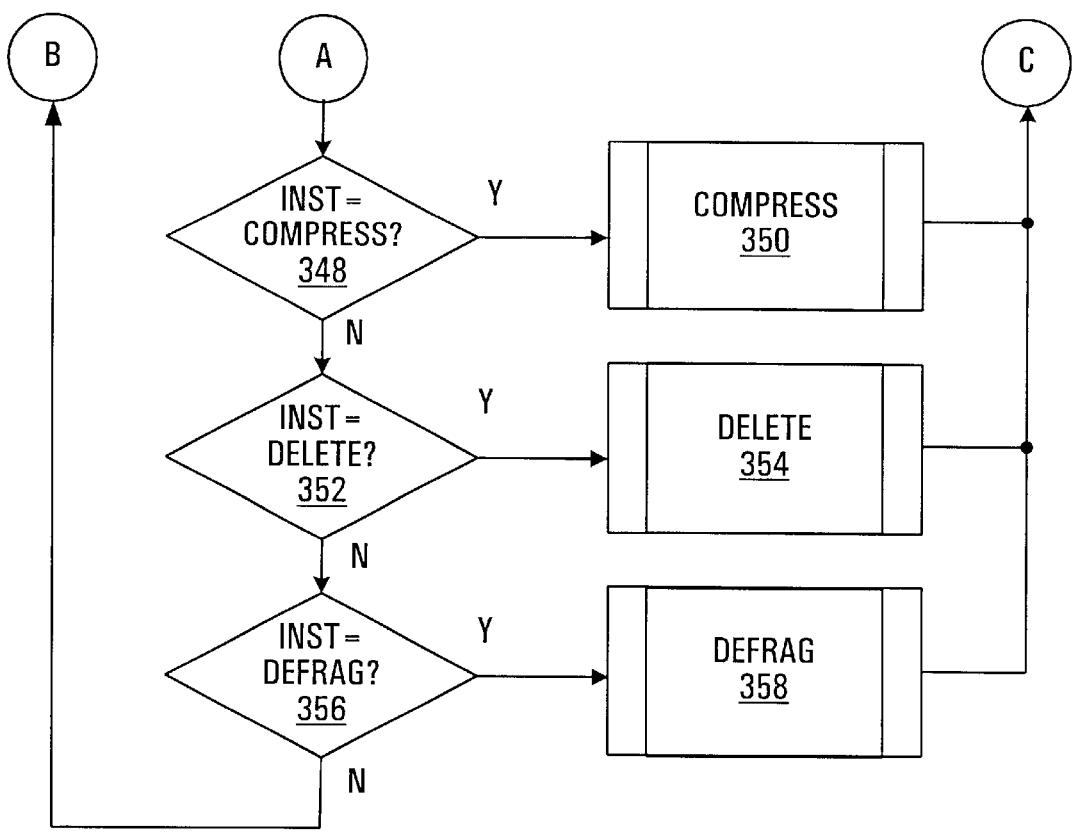
Figure 10A:
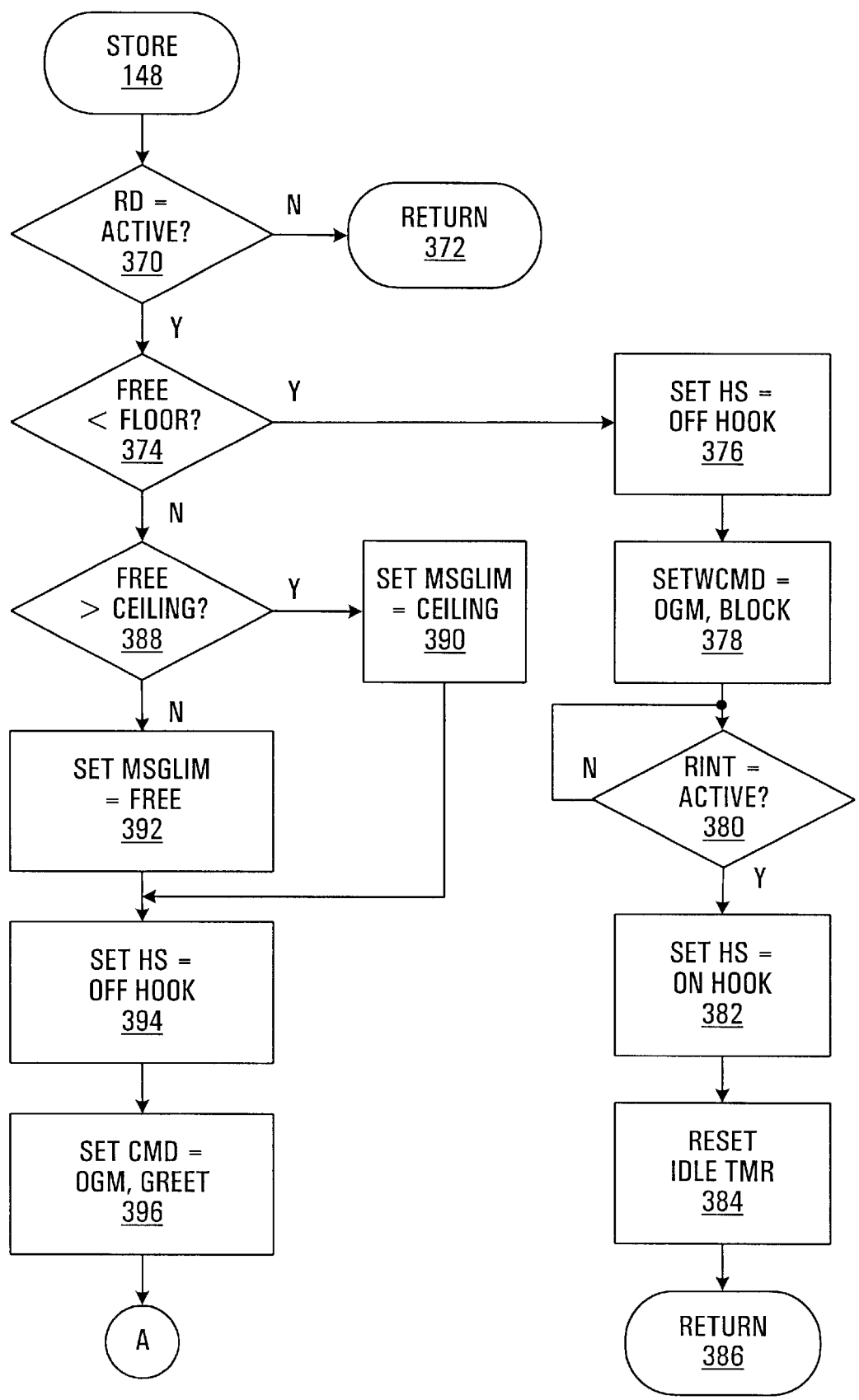
FIGS. 10a–10d are flowcharts describing a STORE subroutine stored in the microprocessor ROM for programming the microprocessor.
Figure 10B:
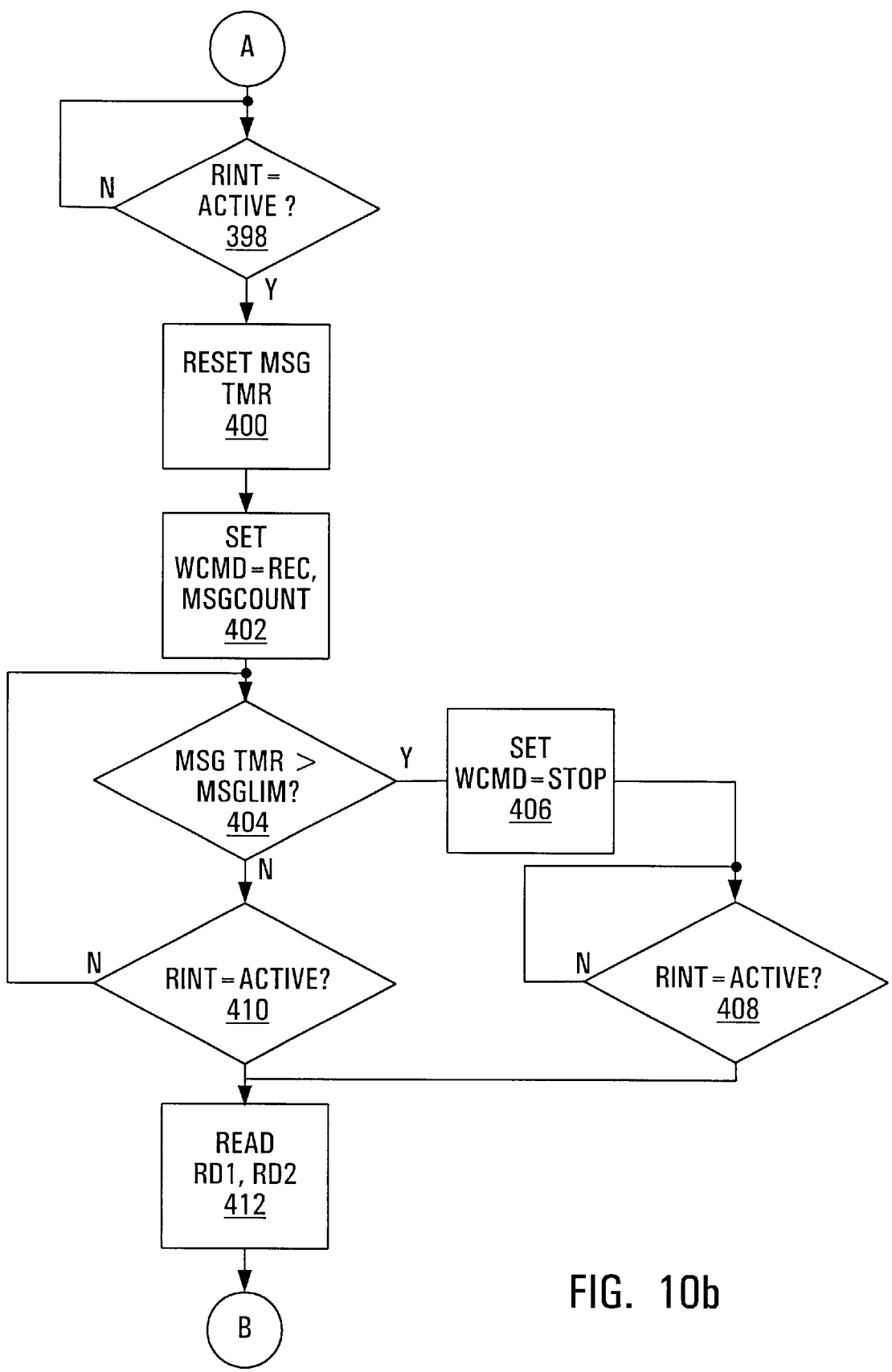
Figure 10C:
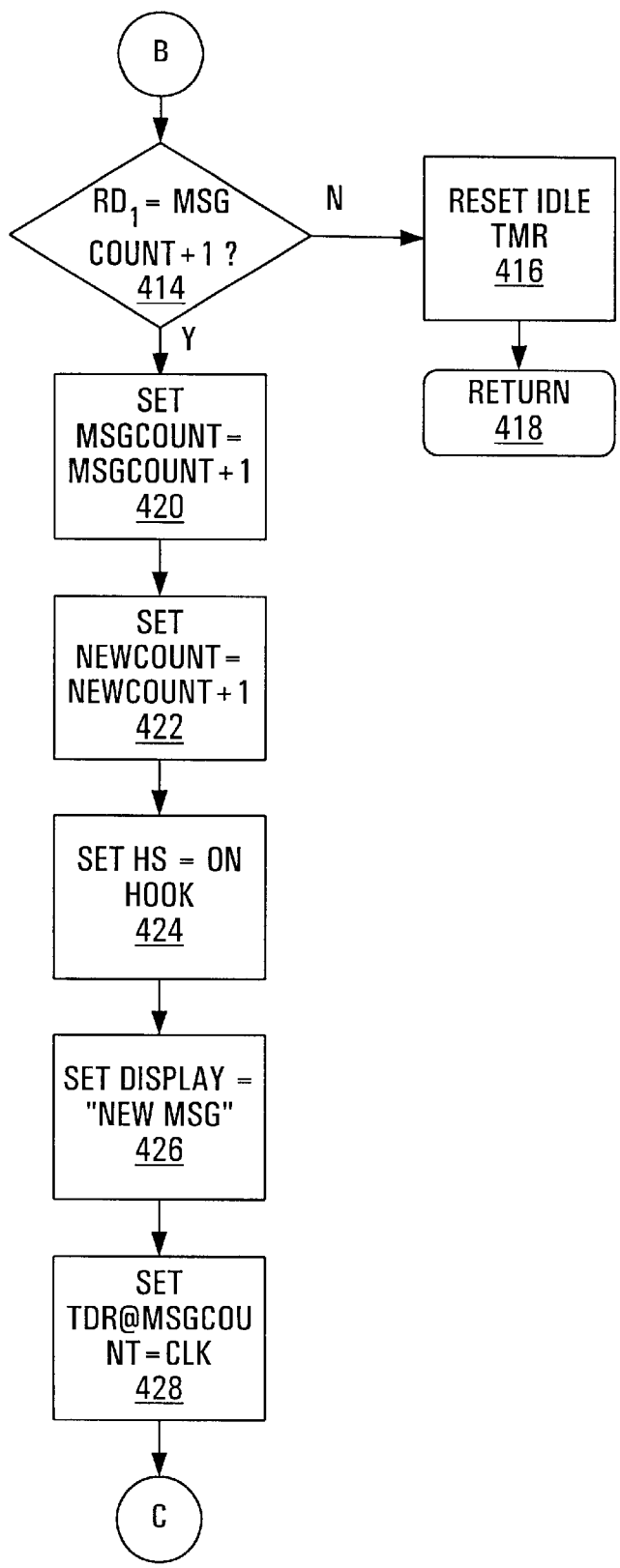
Figure 10D:
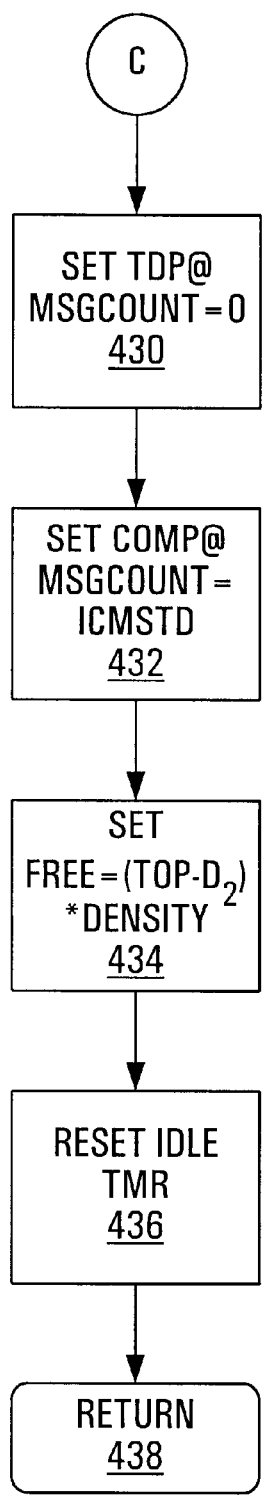
Figure 11A:
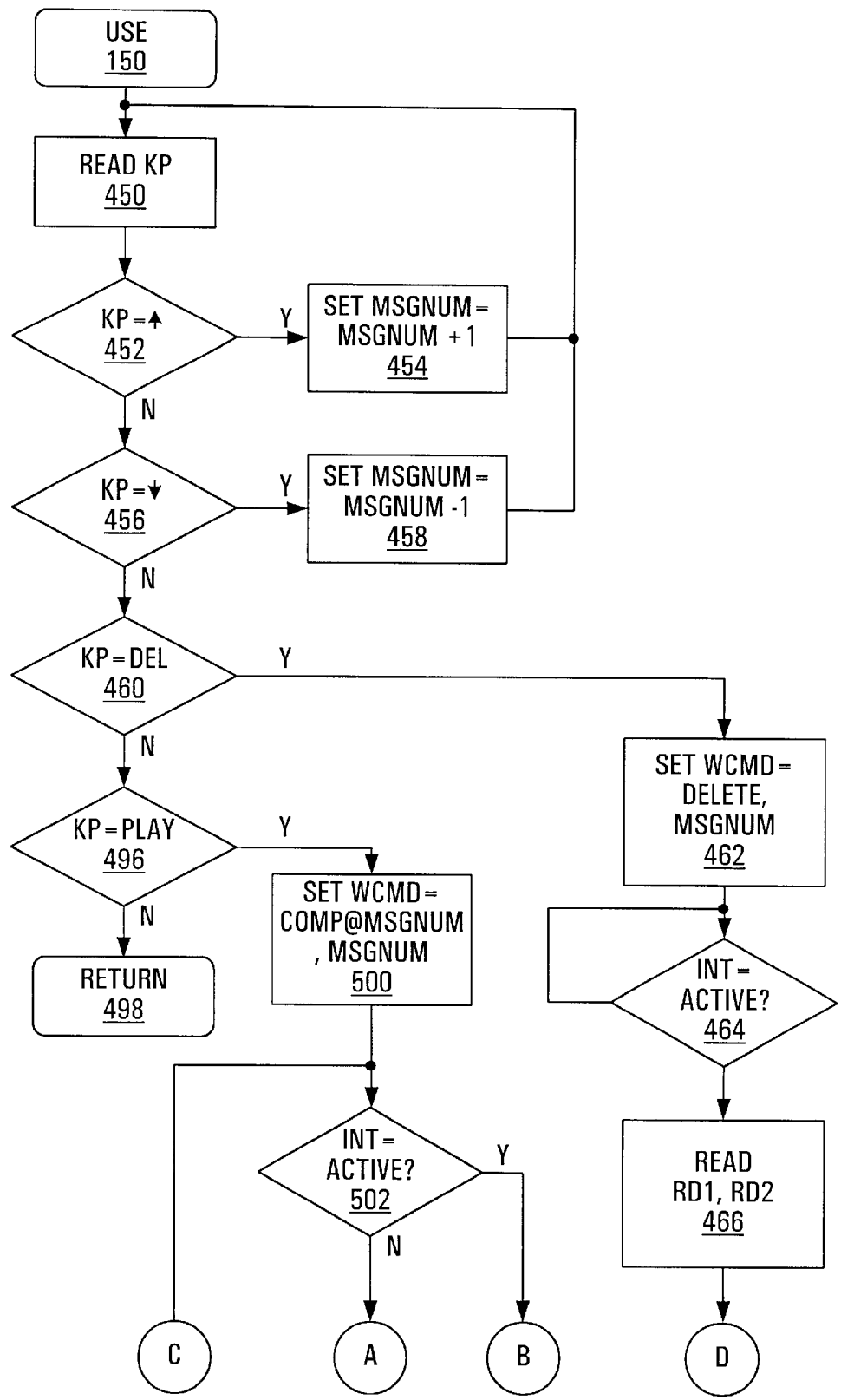
FIGS. 11a–11d are flowcharts describing a USE subroutine stored in the microprocessor ROM for programming the microprocessor.
Figure 11B:
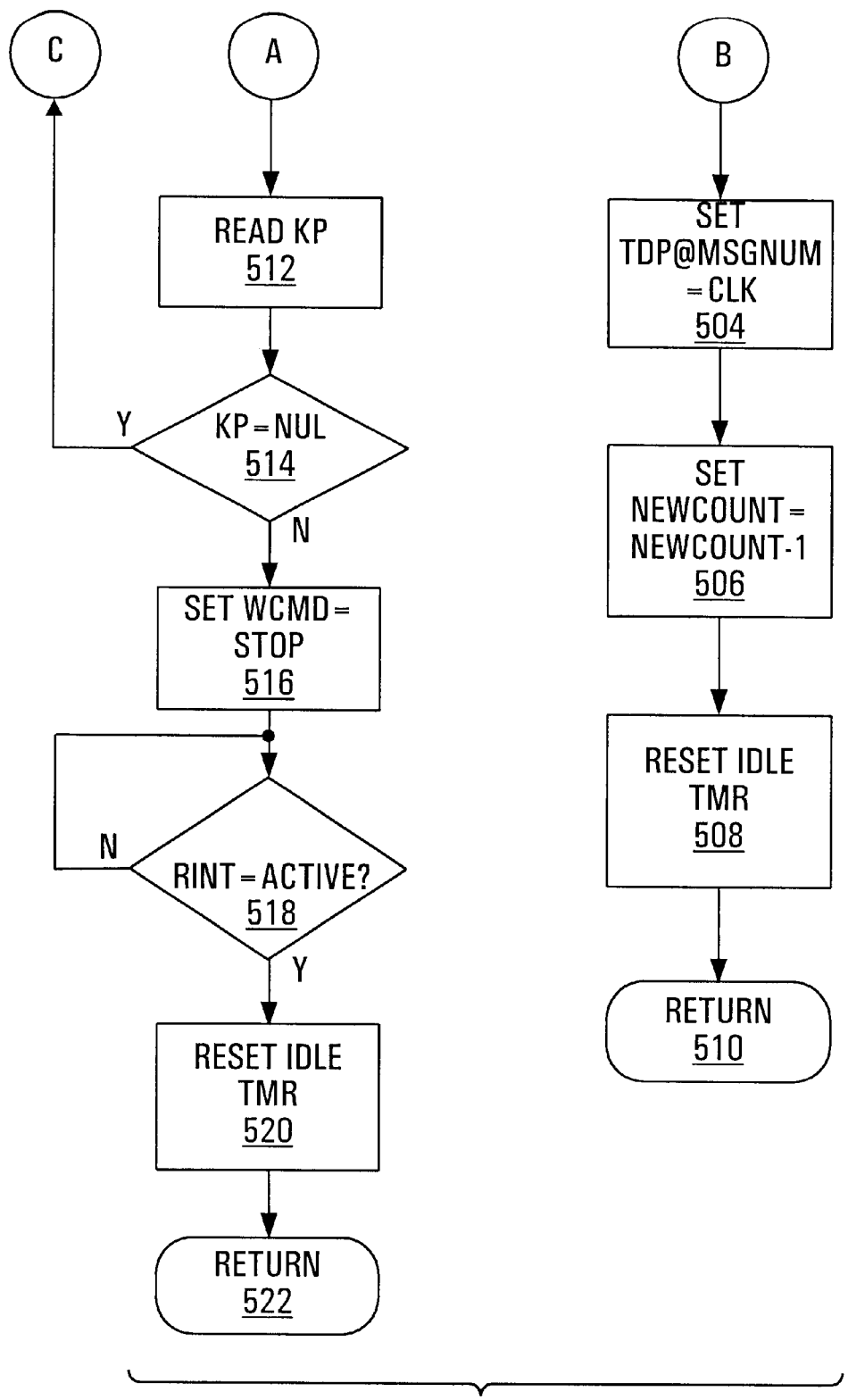
Figure 11C:
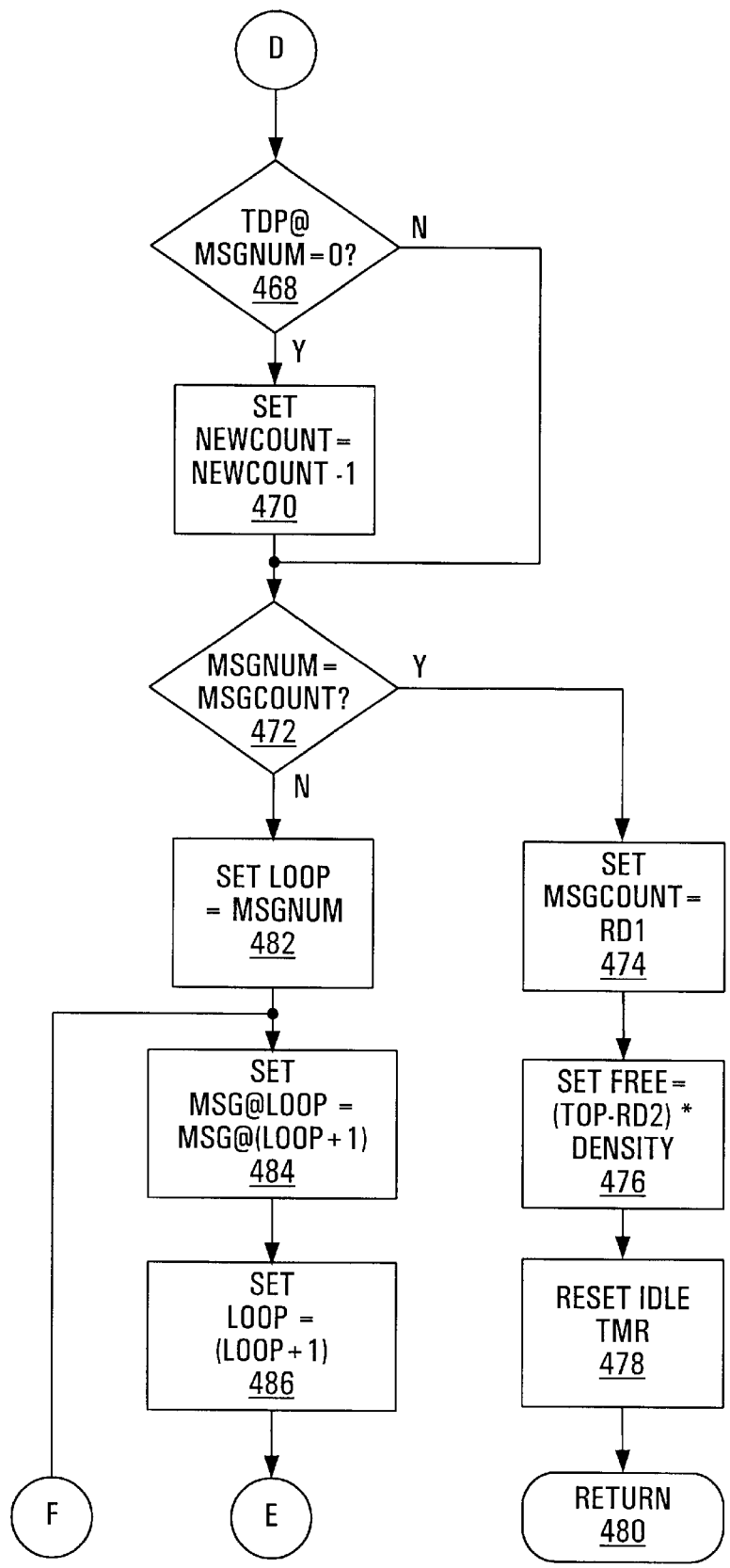
Figure 11D:
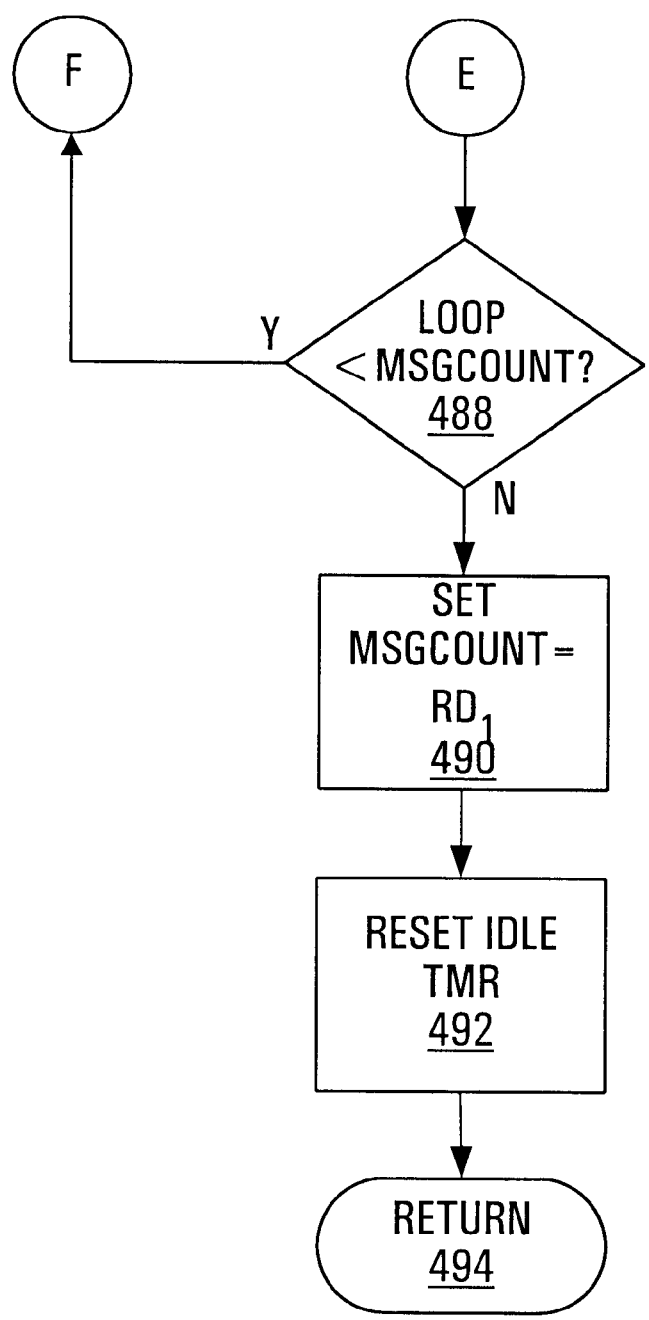

Referring now to FIG. 9, the DSP MAIN LOOP 212 begins with block 330 directing the DSP microprocessor 90 to initialize its DSP FLASH 84 and RAM 86.

The DSP MSGCOUNT buffer 192 is loaded with codes representing the value zero. The DSP MSG buffer 194 and the DATA buffer 195 may be loaded with codes representing null values but this step is not necessary as these buffers are dynamically allocated.

All of the buffers in the DSP RAM 86 are loaded with codes representing the value zero.

Block 332 then directs the DSP microprocessor 90 to execute conventional code not the subject of the present invention.

Block 334 then directs the DSP microprocessor 90 to read the RCMD buffer 98 and to parse the contents as an instruction and associated parameters. The INST buffer 207 is loaded with codes representing the instruction. The VAL buffer 209 is loaded with codes representing the parameters.

Block 336 directs the DSP microprocessor 90 to determine whether the INST buffer contains codes representing the REC mnemonic constant 230. If so, then block 338 directs the DSP microprocessor 90 to execute the REC subroutine 216.

Alternatively, block 340 directs the DSP microprocessor 90 to determine whether the INST buffer contains codes representing the mnemonic constant OGM 236. If so, then block 342 directs the DSP microprocessor 90 to execute the OGM subroutine 218.

Alternatively, block 344 directs the DSP microprocessor 90 to determine whether the INST buffer contains codes representing either the mnemonic constant ICMSTD 232 or the mnemonic constant ICMCOMP 234. In this embodiment, this dual test is implemented by defining the two mnemonic constants to be identical except for one bit. If so, then block 346 directs the DSP microprocessor 90 to execute the ICM subroutine 218.

Alternatively, block 348 directs the DSP microprocessor 90 to determine whether the INST buffer contains codes representing the mnemonic constant COMPRESS 240. If so, then block 350 directs the DSP microprocessor 90 to execute the COMPRESS subroutine 222.

Alternatively, block 352 directs the DSP microprocessor 90 to determine whether the INST buffer contains codes representing the mnemonic constant DELETE 238. If so, then block 354 directs the DSP microprocessor 90 to execute the DELETE subroutine 224.

Alternatively, block 356 directs the DSP microprocessor 90 to determine whether the INST buffer contains codes representing the mnemonic constant DEFRAG 242. If so, then block 358 directs the DSP microprocessor 90 to execute the DEFRAG subroutine 226.

The DSP microprocessor 90 is then directed back to block 332 to once again execute the conventional code.

STORE Subroutine

Referring now to FIG. 10, the microprocessor STORE subroutine 148 is illustrated. The STORE subroutine 148 controls the recording of new voice messages received at the CPE circuit 10, including determining whether or not a new message will be recorded, and if so, the maximum duration of the recording.

The STORE subroutine 148 begins with block 370 which directs the main microprocessor 20 to determine whether or not the contents of the RD register 70 is set ACTIVE, and therefore whether or not the predetermined number of ring signals has been received at the CPE circuit 10 to invoke message recording. If not, then block 372 directs the main microprocessor 20 to return to the calling routine.

Alternatively, if a sufficient number of ring signals have been detected to invoke recording, then block 374 directs the main microprocessor 20 to determine if the value stored in the FREE buffer 122 is less than the value stored in the FLOOR buffer 116.

If so, then there is insufficient DSP FLASH 84 to store a new message. Therefore, block 376 directs the main microprocessor 20 to load the HS port 68 with the mnemonic constant OFFHOOK 180 to cause the hook-switch 24 to assume its off-hook state. Block 378 then directs the main microprocessor 20 to load the WCMD port 96 with the mnemonic constants OGM 162 and BLOCK 174 to instruct the DSP microprocessor 90 to send the "memory full" greeting stored in the BLOCK buffer 193 in the DSP FLASH 84.

Block 380 then directs the main microprocessor 20 to determine whether the RINT port 108 is set ACTIVE, as confirmation that the DSP circuit 82 has ended the current operation. Once it is ACTIVE, then block 382 directs the main microprocessor 20 to load the HS port 68 with the mnemonic constant ONHOOK 178 to cause the hook-switch 24 to assume its on-hook state.

Block 384 then directs the microprocessor 382 to reset the IDLE TMR register 72 to indicate that the CPE circuit 10 has not been sitting idle. Block 386 then directs the microprocessor to return to the calling routine.

Alternatively, if the value stored in the FREE buffer 122 is not less than the value stored in the FLOOR buffer 116, then block 388 directs the microprocessor to determine if the value stored in the FREE buffer 122 is greater than the value stored in the CEILING buffer 118.

If so, then there is more DSP FLASH 84 available than the maximum specified duration message. Therefore, block 390 directs the main microprocessor 20 to load the MSGLIM buffer 136 with the value stored in the CEILING buffer 118. The microprocessor is then directed forward to block 394 as will be discussed below.

Alternatively, if the value stored in the FREE buffer 122 is not greater than the value stored in the CEILING buffer 118, then the value stored in the FREE buffer 122 is bounded by the values stored in the FLOOR buffer 116 and the CEILING buffer 118. Therefore, block 392 directs the main microprocessor 20 to load the MSGLIM buffer 136 with the value stored in the FREE buffer 122.

Block 394 then directs the main microprocessor 20 to load the HS port 68 with the mnemonic constant OFFHOOK 180 to cause the hook-switch 24 to assume its off-hook state. Block 396 then directs the main microprocessor 20 to load the WCMD port 96 with the mnemonic constants OGM 162 and GREET 172 to instruct the DSP microprocessor 90 to send the "leave message" greeting stored in the GREET buffer 191 in the DSP FLASH 84.

Block 398 then directs the main microprocessor 20 to determine whether the RINT port 108 is set ACTIVE as confirmation that the DSP circuit 82 has ended the current operation. Once it is, then block 400 directs the main microprocessor 20 to reset the MSG TMR register 74 to begin timing the expected incoming message.

Block 402 then directs the main microprocessor 20 to load the WCMD port 96 with the mnemonic constant REC 156 and the value stored in the main MSGCOUNT buffer 124 to instruct the DSP microprocessor 90 to record a new incoming message after the last stored message.

Block 404 then directs the main microprocessor 20 to determine whether the value stored in the MSG TMR register 74 is greater than the value stored in the MSGLIM buffer 136. If so, then the new incoming message being recorded by the DSP microprocessor 90 has exceeded its allotted duration and block 406 directs the main microprocessor 20 to load the WCMD port 96 with the mnemonic constant STOP 170 to instruct the DSP microprocessor 90 to stop recording the new incoming message.

Block 408 then directs the main microprocessor 20 to determine whether the RINT port 108 is set ACTIVE as confirmation that the DSP ended the current operation. Once it is, then the DSP microprocessor 90 has completed the STOP operation and the microprocessor is directed forward to block 412 as will be discussed below.

Alternatively, if the value stored in the MSG TMR register 74 is not greater than the value stored in the MSGLIM buffer 136, then block 410 directs the microprocessor to determine whether the RINT port 108 is set ACTIVE. If so, then the DSP microprocessor 90 has thereby indicated that it has ended recording the new incoming message and the main microprocessor 20 is directed forward to block 412 which will be further discussed below.

Alternatively, if the RINT port 108 is not set ACTIVE, then the main microprocessor 20 is directed back to block 404 to once again check the MSG TMR register 74.

Block 412 directs the main microprocessor 20 to read the RD1 port 100 and the RD2 port 104 to query status information passed back by the DSP microprocessor 90.

Block 414 directs the main microprocessor 20 to determine if the value stored in the RD1 port 100 is equal to the sum of the value stored in the main MSGCOUNT buffer 124 plus one. If not, then the DSP microprocessor 90 is indicating that no new incoming message was recorded. Block 416 directs the main microprocessor 20 to reset the IDLE TMR to indicate that the CPE circuit 10 has not been idle and block 418 directs the main microprocessor 20 to return to the calling routine.

Alternatively, if a new message has been recorded, then block 420 directs the main microprocessor 20 to increment the value stored in the main MSGCOUNT buffer 124 to indicate that one more message is now being stored. Similarly, block 422 directs the main microprocessor 20 to increment the value stored in the NEWCOUNT buffer 126 to indicate that one more unheard message is now being stored.

Block 424 then directs the main microprocessor 20 to load the HS port 68 with the value stored in the ONHOOK mnemonic constant 178 to cause the hook-switch 24 to assume its on-hook state.

Block 426 then directs the main microprocessor 20 to load the DISP port 78 with codes that will cause the display interface 44 to cause the visual display 60 to display the information "New Message". Thus the visual display 60 acts as an annunciator for and annunciating means for annunciating a representation of the played attribute to the user.

Block 428 then directs the main microprocessor 20 to access the arrayed main MSG buffer 114 and to load the TDR element 130 of the record 128 indexed by the value stored in the main MSGCOUNT buffer 124 with the current value of the CLK register 76. This step tags the record 128 with a time-stamp representing the approximate time that the message was recorded. Thus, the main microprocessor 20, as programmed by the codes stored in the main ROM 18, acts as associating means for associating and as a processor programmed to associate with the voice message a time attribute identifying a time of storing the coded representation.

Block 430 then directs the main microprocessor 20 to access the arrayed main MSG buffer 114 and to load the TDP element 132 of the record 128 indexed by the value stored in the main MSGCOUNT buffer 124 with the value zero to indicate that the associated message has not yet been played.

Block 432 then directs the main microprocessor 20 to access the arrayed main MSG buffer 114 and to load the COMP element 134 of the record 128 index by the value stored in the main MSGCOUNT buffer 124 with the mnemonic constant ICMSTD 158 to indicate that the associated message has not yet been compressed.

Block 434 then directs the main microprocessor 20 to read the value stored in the RD2 port 104 and to store in the FREE buffer 122 the difference of the value stored in the RD2 port 104 subtracted from the value stored in the TOP buffer 121, all multiplied by the value stored in the DENSITY buffer 120. This step updates the time-measure of the amount of memory still available for recording messages after the newest message has been recorded.

Block 436 then directs the main microprocessor 20 to reset the IDLE TMR register 72 and block 438 directs the microprocessor to return to the calling routine.

USE Subroutine

Referring now to FIG. 11, the USE subroutine 150 is illustrated. The USE subroutine 150 controls the user's interaction with the CPE circuit 10, including selecting a recorded message to operate upon, and playing or deleting the selected message. The USE subroutine 150 begins with block 450 which directs the main microprocessor 20 to read the KP port 80 to determine if the user has activated the keypad 66.

Block 452 directs the main microprocessor 20 to determine whether the value stored in the KP port 80 is equal to the mnemonic constant UPARROW 182. If so, then block 454 directs the main microprocessor 20 to increment the value stored in the main MSGNUM buffer 138. The main microprocessor 20 is then directed back to block 450 to again read the KP port 80.

Alternatively, block 456 directs the main microprocessor 20 to determine whether the value stored in the KP port 80 is equal to the mnemonic constant DOWNARROW 184. If so, then block 458 directs the main microprocessor 20 to decrement the value stored in the main MSGNUM buffer 138. The main microprocessor 20 is then directed back to block 450 to again read the KP port 80.

Alternatively, block 460 directs the main microprocessor 20 to determine whether the value stored in the KP port 80 is equal to the mnemonic constant DEL 186. If so, then the user has indicated that he wishes to delete the current message as indexed by the value stored in the main MSGNUM buffer 138. Therefore, block 462 directs the main microprocessor 20 to load the WCMD port 96 with the mnemonic constant DELETE 164 and the value stored in the main MSGNUM buffer 138.

Block 464 then directs the main microprocessor 20 to determine whether the RINT port 108 is set ACTIVE as confirmation that the DSP circuit 82 has ended the current operation. Once it is ACTIVE, then block 466 directs the main microprocessor 20 to read the RD1 port 100 and the RD2 port 104 to determine the DSP status after the delete operation. As will be discussed further below, at this point the DSP circuit 82 has recently loaded the RD1 port 100 with a value representing the number of stored messages and loaded the RD2 port 104 with a value representing the last used memory location in the DSP FLASH 84.

Block 468 then directs the main microprocessor 20 to access the arrayed main MSG buffer 114 and to read the TDP element 132 of the record 128 as indexed by the value stored in the main MSGNUM buffer 138. If that value is zero, then the deleted message was deleted before it was ever played and therefore block 470 directs the main microprocessor 20 to decrement the value stored in the NEWCOUNT buffer 126. The microprocessor is then directed forward to block 472.

Alternatively, if the deleted message had been played before being deleted, then block 470 is skipped and the microprocessor is directed straight to block 472.

Block 472 directs the main microprocessor 20 to compare the value stored in the main MSGNUM buffer 138 to the value stored in the main MSGCOUNT buffer 124. If the values are equal, then the deleted message was the most recently recorded message. The deleted message was therefore the message stored in the highest portion of the DSP FLASH 84 and was associated with the last record in the main MSG buffer 114. Therefore that DSP FLASH 84 memory space and that position in the main MSG buffer 114 array can be reclaimed without affecting any other stored message.

In this specific situation therefore, block 474 directs the main microprocessor 20 to store in the main MSGCOUNT buffer 124 the value that is stored in the RD1 port 100, being the number of stored messages according to the DSP circuit 82. This step has the effect that the last assigned index in the main MSG buffer 114 is reclaimed for future use.

Block 476 then directs the main microprocessor 20 to store in the FREE buffer 122 the difference of the value stored in the RD2 port 104 subtracted from the value stored in the TOP buffer 121, all multiplied by the value stored in the DENSITY buffer 120. This step recalibrates the time-measure of the DSP FLASH 84 available for recording messages after the recent message deletion.

Block 478 then directs the main microprocessor 20 to reset the IDLE TMR register 72 and block 480 directs the main microprocessor 20 to return to the calling routine.

Alternatively, if the valued stored in the main MSGNUM buffer 138 is not equal to the value stored in the main MSGCOUNT buffer 124, then a message other than the most recently recorded message has been deleted and all subsequently created message records 128 must be shifted one position earlier in the in the main MSG buffer 114 array to close a gap created by the deletion of the deleted record 128.

Therefore, block 482 directs the main microprocessor 20 to store in the LOOP buffer 140 the value stored in the main MSGNUM buffer 138, representing the position in the array of the record deleted from the main MSG buffer 114.

Block 484 then directs the main microprocessor 20 to store in the main MSG buffer 114 as the record 128 indexed by the value stored in the LOOP buffer 140 the record values stored in the main MSG buffer 114 as the record 128 indexed by one more than the value stored in the LOOP buffer 140.

Block 486 then directs the main microprocessor 20 to increment the value stored in the LOOP buffer 140.

Block 488 then directs the main microprocessor 20 to determine whether the value stored in the LOOP buffer 140 is less than the value stored in the main MSGCOUNT buffer 124. If so, then there still exist records 128 to shift, and the microprocessor is directed back to block 484.

Alternatively, if all records 128 have been shifted, then block 490 directs the main microprocessor 20 to store in the main MSGCOUNT buffer 124 the value stored in the RD1 port 100, being the number of stored messages according to the DSP circuit 82. Block 492 then directs the main microprocessor 20 to reset the IDLE TMR register 72 and block 494 directs the microprocessor to return to the calling routine.

Alternatively, if at block 460 the value stored in the KP port 80 is not equal to the mnemonic constant DEL 186, then block 496 directs the main microprocessor 20 to determine if the value stored in the KP port 80 is equal to the mnemonic constant PLAY 188. If not, then block 498 directs the microprocessor to return to the calling routine.

Alternatively, if the value stored in the KP port 80 is equal to the mnemonic constant PLAY 188, then block 500 directs the main microprocessor 20 to store in the WCMD port 96 both the value stored in the COMP element 134 indexed by the valued stored in the main MSGNUM buffer 138 and the value stored in the main MSGNUM buffer 138 itself.

It will be recalled that the COMP element 134 stores either the mnemonic constant ICMSTD 158 or the mnemonic constant ICMCOMP 160. Therefore, this step loads the WCMD port 96 with the number of the message to be played and an instruction to play a message using either a standard or a decompression algorithm.

Block 502 then directs the microprocessor to determine whether the RINT port 108 has been set ACTIVE. If so, then the DSP play operation has ended and block 504 directs the microprocessor to store in the TDP element 132 indexed by the value stored in the main MSGNUM buffer 138 the value stored in the CLK register 76 to tag the record 128 with a time-stamp representing the approximate time that the associated message was played. Thus, the main microprocessor 20, as programmed by the codes stored in the main ROM 18, acts as associating means for associating and as a processor programmed to associate a played attribute with the voice message, the played attribute indicating whether or not the coded representation has been retrieved. Furthermore, the main microprocessor 20, as programmed by the codes stored in the main ROM 18, acts as attribute setting means for setting and as a processor programmed to set the played attribute active when the coded representation is retrieved.

Block 506 then directs the main microprocessor 20 to decrement the value stored in the NEWCOUNT buffer 126 because there is now one less unplayed message. Block 508 then directs the main microprocessor 20 to reset the IDLE TMR register 72 and block 512 directs the main microprocessor 20 to return to the calling routine.

Alternatively, if at block 502 the RINT port 108 has not been set ACTIVE, then block 512 directs the main microprocessor 20 to read the KP port 80. Block 514 then directs the microprocessor to determine if the value stored in the KP port 80 is the mnemonic constant NUL 190, in which case no keypress activity has occurred to interrupt the DSP play operation and the microprocessor is directed back to block 502.

Alternatively, if the value stored in the KP port 80 is not equal to the mnemonic constant NUL 190, then block 516 directs the main microprocessor 20 to store in the WCMD port 96 the mnemonic constant STOP 170. Block 518 then directs the microprocessor to determine whether the RINT port 108 has been set ACTIVE to confirm that the DSP circuit 82 has ended the current operation. Once it has been set ACTIVE, then block 520 directs the main microprocessor 20 to reset the IDLE TMR register 72 and block 522 directs the microprocessor to return to the calling routine.

PACK Subroutine

Figure 12A:
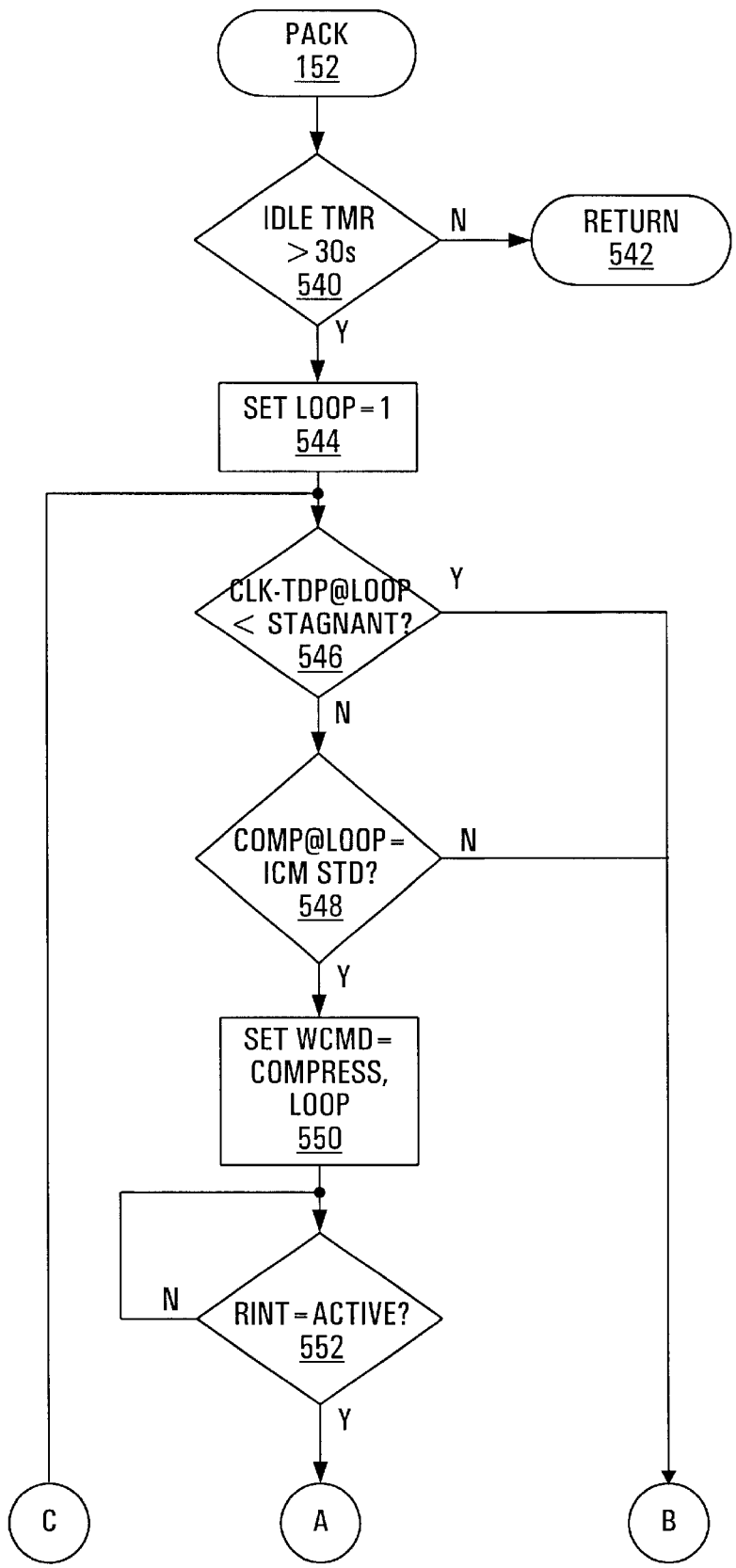
FIGS. 12a–12c are flowcharts describing a PACK subroutine stored in the microprocessor ROM for programming the microprocessor.
Figure 12B:
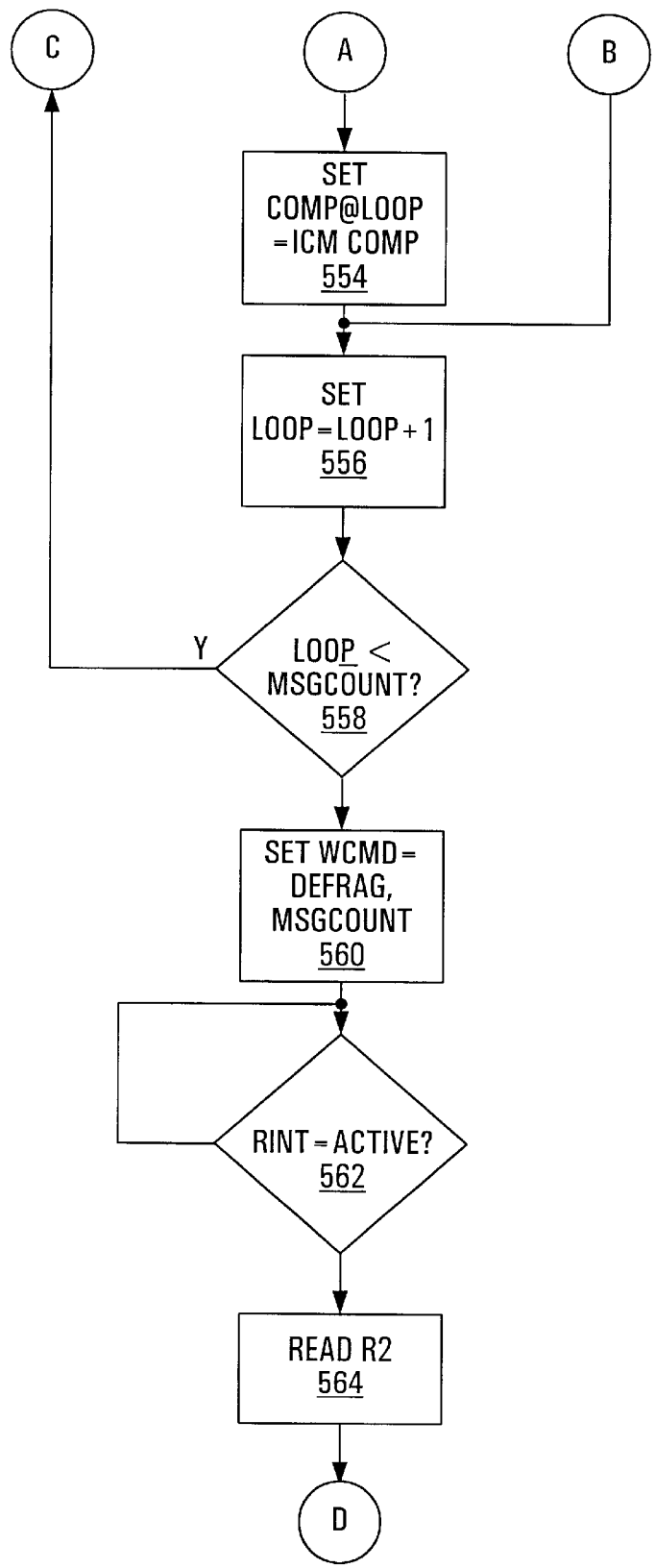
Figure 12C:
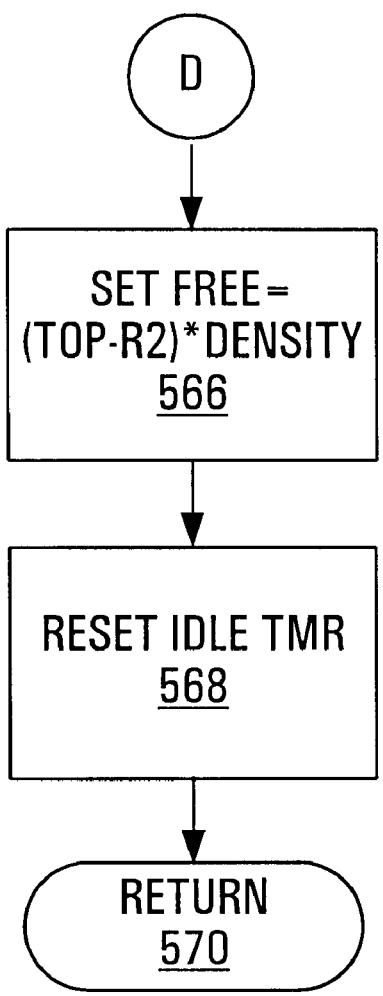

Referring now to FIG. 12, the PACK subroutine 152 is illustrated. The PACK subroutine 152 directs the main microprocessor 20 to control message compression and memory defragmentation in the DSP FLASH 84 during periods when the CPE circuit 10 is idle. The PACK subroutine 152 begins with block 540 which directs the microprocessor to determine whether the value stored in the IDLE TMR register 72 is greater than 30 seconds. If not, then the CPE circuit 10 is too busy for housekeeping functions and block 542 directs the main microprocessor 20 to return to the calling routine.

Alternatively, if the value stored in the IDLE TMR register 72 is greater than 30 seconds, then block 544 directs the main microprocessor 20 to store in the LOOP buffer 140 the value 1. This step initializes a programming loop for sequentially selecting each of the records 128 in the main MSG buffer 114.

Block 546 then directs the main microprocessor 20 to determine whether the difference of the value stored in the TDP element 132 indexed by the value in the LOOP buffer 140 subtracted from the value stored in the CLK register 76 is less than or equal to the value stored in the STAGNANT buffer 125.

If so then the associated message in the main MSG buffer 114 has either not yet been played or has been played only recently and is therefore not appropriate for compressing. Therefore the main microprocessor 20 is directed forward to block 556, which will be discussed below. Thus, the main microprocessor 20, as programmed by the codes stored in the main ROM 18, acts as timing means for determining and as a processor programmed to determine the time elapsed since the coded representation was retrieved and for actuating the compressing means after a predetermined period of time after the coded representation has been retrieved.

Alternatively, if the TDP element 132 indexed by the value in the LOOP buffer 140 is not equal to 0, then block 548 directs the main microprocessor 20 to determine whether the COMP element 134 indexed by the value in the LOOP buffer 140 is equal to the mnemonic constant ICM-STD. If not, the associated message in the MSG buffer 138 has already been compressed and the main microprocessor 20 is directed forward to block 556, which will be discussed below.

Alternatively, if the COMP element 134 indexed by the value in the LOOP buffer 140 is equal to the MNEMONIC constant ICMSTD, then the indexed message has been heard but not yet compressed and block 550 directs the main microprocessor 20 to store in the WCMD port the mnemonic constant COMPRESS 166 and the value stored in the LOOP buffer 140 to index the message to be compressed.

Block 552 then directs the main microprocessor 20 to determine whether the RINT port 108 has been set ACTIVE as confirmation that the DSP Compress operation has completed normally. Block 554 then directs the main microprocessor 20 to store in the COMP buffer 134 indexed by the LOOP buffer 140 the mnemonic constant ICMCOMP 160 to indicate that the associated message has been compressed.

Thus, the main microprocessor 20, as programmed by the codes stored in the main ROM 18, acts as an associating means for associating and a processor programmed to associate a compressed attribute with the voice message, the compressed attribute indicating whether or not the message is represented by the compressed representation.

It should also be noted that the main microprocessor 20, as programmed by the codes stored in the main ROM 18, acts as a processor programmed to compress the coded representation when the played attribute is active and to set the compressed attribute active after compressing the coded representation, or in other words, acts as compressing means activated when the played attribute is active and as attribute setting means for setting the compressed attribute active in response to compressing the coded representation.

Block 556 then directs the main microprocessor 20 to increment the value stored in the LOOP buffer 140. Block 558 then directs the main microprocessor 20 to determine whether the value stored in the LOOP buffer 140 is less than or equal to the value stored in the main MSGCOUNT buffer 124. If so, then the microprocessor is directed back to block 546 to continue executing the loop code.

Alternatively, if the value stored in the LOOP buffer 140 is not less than or equal to the value stored in the main MSGCOUNT buffer 124, then block 560 directs the main microprocessor 20 to store in the WCMD port 96 the mnemonic constant DEFRAG 168 and the value stored in the main MSGCOUNT buffer 124 to cause the DSP circuit 82 to defragment its DSP FLASH 84 which has been fragmented as a result of message compression.

Block 562 then directs the main microprocessor 20 to determine if the RINT port 108 has been set ACTIVE as confirmation that the DSP has ended the defragmentation operation. Once it has been set ACTIVE, then block 564 directs the main microprocessor 20 to read the RD2 port 104, which, as will be discussed further below with reference to FIG. 18, has been loaded by the DSP circuit 82 with a value representing the last used cell in the DSP FLASH 84.

Block 566 then directs the main microprocessor 20 to store in the FREE buffer 122 the difference of the value stored in the RD2 port 104 subtracted from the value stored in the TOP buffer 121, all multiplied by the value stored in the DENSITY buffer 120. This step recalibrates the timemeasure of DSP FLASH 84 available for storing new messages after the defragmentation operation.

Block 568 then directs the main microprocessor 20 to reset the IDLE TMR register 72 and block 570 directs the main microprocessor 20 to return to the calling routine.

DSP REC Subroutine

Figure 13A:
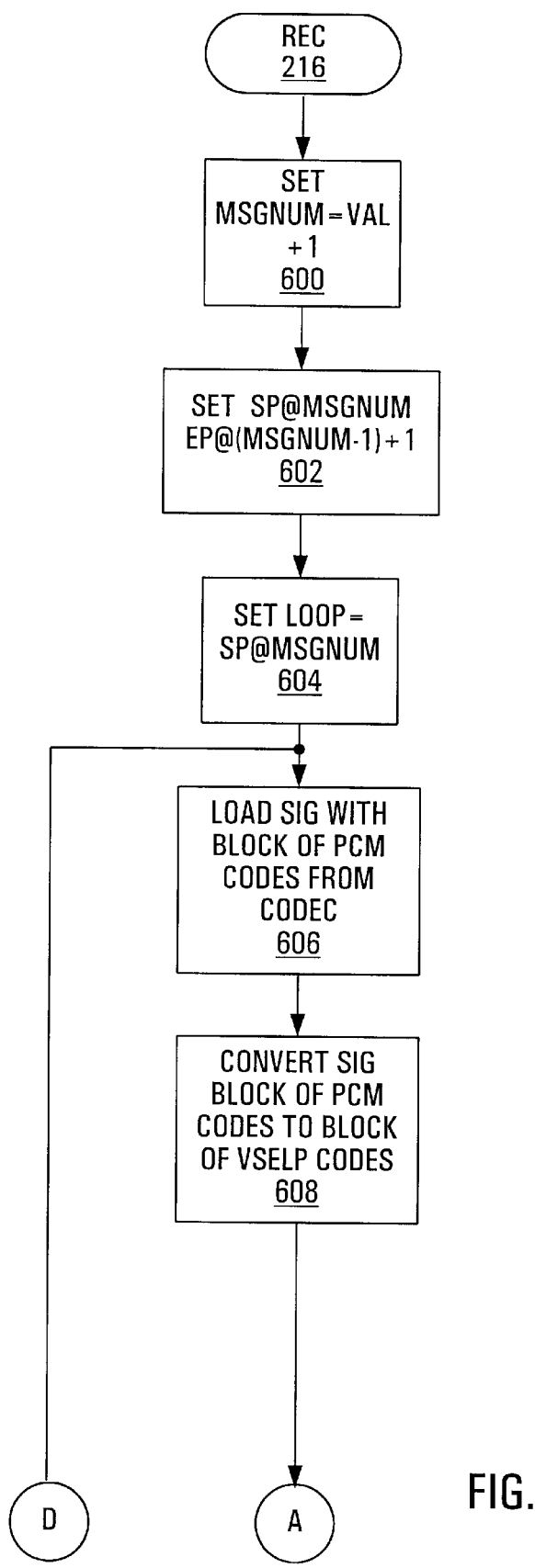
FIGS. 13a–13c are flowcharts describing a REC subroutine stored in the DSP ROM for programming the DSP.
Figure 13B:
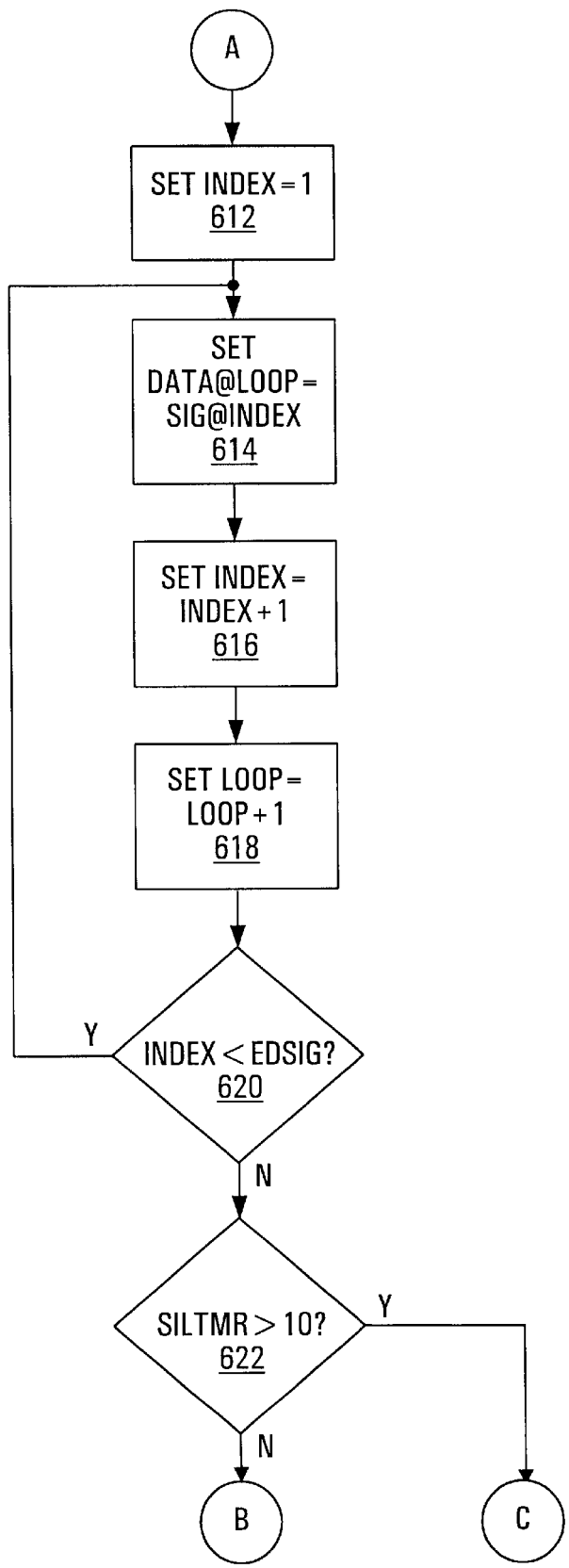
Figure 13C:
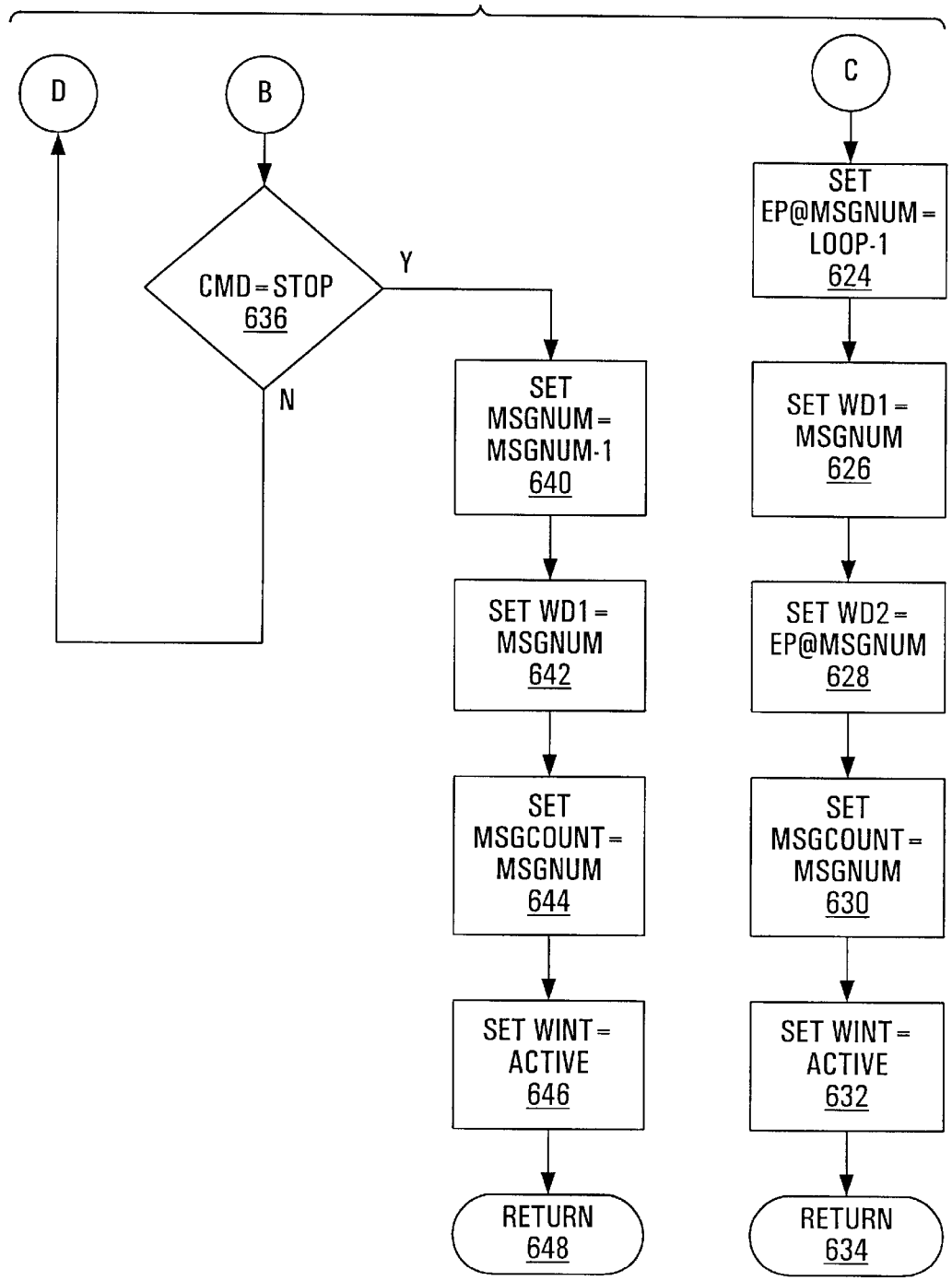

Referring now to FIG. 13, the DSP REC subroutine 216 is illustrated. The REC subroutine 216 directs the DSP microprocessor 90 in recording a new audio signal received as pulse code modulated (PCM) samples from the CODEC 38 and in storing the received PCM signal as a vector sum excited linear prediction (VSELP) coded signal in the DSP FLASH 84.

The REC subroutine 216 begins with block 600 which directs the DSP microprocessor 90 to store in the DSP MSGNUM buffer 202 the sum of the value stored in the VAL buffer 209 plus one to assign to the expected new message the next available record 196.

Block 602 then directs the DSP microprocessor 90 to store in the SP element 198 indexed by the value in the DSP MSGNUM buffer 202 the sum of one plus the value stored in the EP element 200 indexed by the difference of the value stored in the DSP MSGNUM buffer 202 subtract one. This step selects as the next storage location in the DSP FLASH 84 the location immediately after the location used to store the last sample of the last message recorded.

Block 604 then directs the DSP microprocessor 90 to store in the LOOP buffer 206 the value stored in the SP element indexed by the value in the DSP MSGNUM buffer 202. This step initializes a loop for sequentially selecting locations in the DSP FLASH 84 for storing the next VSELP signal sample.

Block 606 then directs the DSP microprocessor 90 to load the SIG buffer 92 with a succession of PCM coded signal samples received from the CODEC 38. In practice, the number of samples from the CODEC 38 will likely be greater than the capacity of the SIG buffer 92 and therefore such overflow samples will be queued in the DSP RAM 86 pending subsequent processing in blocks or batches. As mentioned above, such memory management issues are known and for these purposes transparent and will not be discussed further.

Block 608 then directs the DSP microprocessor 90 to convert the PCM coded signal received into the SIG buffer 92 into a VSELP coded signal. Block 612 then directs the DSP microprocessor 90 to store in the INDEX buffer 208 the value one. This step initializes a loop for sequentially selecting locations in the DSP SIG buffer 92 for reading a signal sample.

Block 614 then directs the DSP microprocessor 90 to store in the DATA buffer 195 indexed by the LOOP buffer 206 the value stored in the SIG buffer 92 indexed by the INDEX buffer 208. In this way, a VSELP signal sample is stored in the DSP FLASH 84 as a message sample. Block 616 then directs the DSP microprocessor 90 to increment the value stored in the INDEX buffer 208 and block 618 directs the DSP microprocessor 90 to increment the value stored in the LOOP buffer 206.

Block 620 then directs the DSP microprocessor 90 to determine whether the value stored in the INDEX buffer 208 is less than the mnemonic constant EOSIG 252 which has a value that represents the end of the physical memory space of the SIG buffer 92. If so, then the DSP microprocessor 90 is directed back to block 614 and directed to store the next VSELP signal sample in the next location in the DSP FLASH 84.

Alternatively, if the value stored in the INDEX buffer 208 is not less than the mnemonic constant EOSIG 252, then block 622 directs the DSP microprocessor 90 to determine whether the value stored in the SIL TMR 94 is greater than 10 seconds. If so, then it is assumed that the message is finished and block 624 directs the DSP microprocessor 90 to store in the EP element 200 indexed by the value stored in the DSP MSGNUM buffer 202 the difference of the value stored in the LOOP buffer 206 subtract one, which represents the last location used in the DSP FLASH 84 to store the new message.

Block 626 then directs the DSP microprocessor 90 to store in the WD1 port 102 the value stored in the DSP MSGNUM, buffer 202. Block 628 then directs the DSP microprocessor 90 to store in the WD2 port 106 the value stored in the EP element 200 indexed by the value stored in the DSP MSGNUM buffer 202. Block 630 directs the DSP microprocessor 90 to store in the DSP MSGCOUNT buffer 192 the value stored in the DSP MSGNUM buffer 202.

Then block 632 directs the DSP microprocessor 90 to store in the WINT port 110 the value stored in the mnemonic constant ACTIVE 250 and block 634 directs the DSP microprocessor 90 to return to the calling routine. In this way, the DSP microprocessor 90 stores the current number of messages and passes that number along with the last used DSP FLASH 84 location to the main microprocessor 20, before invoking an interrupt.

Thus, the DSP microprocessor 90, as programmed by the codes stored in the DSP ROM 88, acts as a processor and first storing means for associating a block of memory with the voice message and for storing a coded representation of the voice message in the block of memory and for sizing the block of memory to correspond to the size of the coded representation.

In maintaining an SP element 198 and an EP element 200 for each voice message, the DSP microprocessor 90, as programmed by the codes stored in the DSP ROM 88, acts as an associating means for associating and a processor programmed to associate a location attribute with the voice message, the location attribute identifying the block of memory at which the coded representation or the compressed representation is stored.

Alternatively, if the value stored in the SIL TMR 94 is less than 10 seconds, then block 636 directs the DSP microprocessor 90 to read the RCMD port 98 to determine whether the mnemonic constant STOP 244 has been received.

If not, then the DSP microprocessor 90 is directed back to block 606 to reload the next batch of PCM signal samples into the SIG buffer 92.

Alternatively, if the mnemonic constant STOP 244 has been received, then the DSP microprocessor 90 is being instructed by the main microprocessor 20 to abort the current recording process. Therefore block 640 directs the DSP microprocessor 90 to decrement the value stored in the DSP MSGNUM buffer 202.

Block 642 directs the DSP microprocessor 90 to store in the WD1 port 102 the value stored in the DSP MSGNUM buffer 202. Block 644 directs the DSP microprocessor 90 to store in the DSP MSGCOUNT buffer 192 the value stored in the DSP MSGNUM buffer 202. Block 646 directs the DSP microprocessor 90 to store in the WINT port the mnemonic constant ACTIVE 250 and block 648 directs the DSP microprocessor 90 to return to the calling routine.

In this way, the DSP microprocessor 90 restores the current number of messages, which was unaffected by the aborted recording operation, and passes that number back to the main microprocessor 20 before invoking an interrupt.

The REC subroutine 216 is called each time a new message is to be recorded. Thus, the DSP microprocessor 90, as programmed by the codes stored in the DSP ROM 88, acts as storage means for storing and a processor programmed to store a plurality of coded representations of respective voice messages in respective blocks of memory and to size the blocks of memory to correspond to the sizes of respective coded representations.

In fact, the DSP microprocessor 90, as programmed by the codes stored in the DSP ROM 88, acts as storing means for storing and a processor programmed to store the plurality of coded representations representing the messages either in respective blocks of memory in a predefined order or in respective contiguous blocks of memory.

It will also be noticed that the DSP microprocessor 90, as programmed by the codes stored in the DSP ROM 88, acts as resizing means for resizing and a processor programmed to resize the respective blocks of memory associated with played voice messages, to approximately the respective sizes of respective compressed representations.

DSP OGM Subroutine

Figure 14:
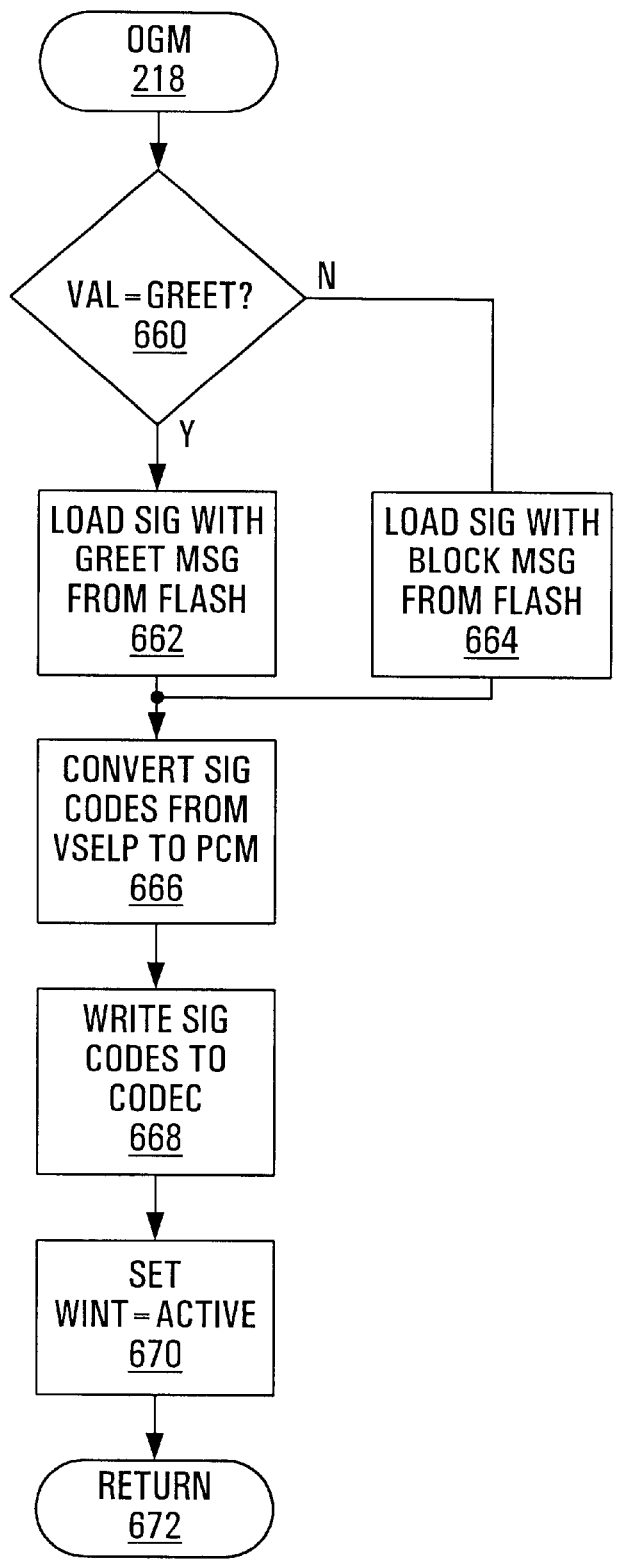
FIG. 14 is a flowchart diagram of an OGM subroutine stored in the DSP ROM for programming the DSP.

Referring now to FIG. 14, the DSP OGM sub-routine 218 is illustrated. The OGM subroutine 218 directs the DSP microprocessor 90 in selecting and playing an appropriate out-going message when a caller engages the CPE circuit 10.

The OGM subroutine 218 begins with block 660 which directs the DSP microprocessor 90 to determine if the value stored in the VAL buffer 209 is equal to the mnemonic constant GREET 246. If so, then block 662 directs the DSP microprocessor 90 to load the SIG buffer 92 with the values stored in the GREET buffer 191 that encode a human-intelligible message inviting callers to leave a message.

Alteratively, block 664 directs the DSP microprocessor 90 to load the SIG buffer 92 with the values stored in the BLOCK buffer 193 that encode a human-intelligible message advising callers not to leave a message.

In either case, block 666 directs the DSP microprocessor 90 to convert the values stored in the SIG buffer 92 from VSELP coding to PCM coding. Block 668 then directs the DSP microprocessor 90 to write successive values stored in the SIG buffer 92 to the CODEC 38.

Block 670 then directs the DSP microprocessor 90 to store in the WINT port 110 the value stored in the mnemonic constant ACTIVE 250 to invoke an interrupt signifying that the required greeting has been played and block 672 directs the DSP microprocessor 90 to return to the calling routine.

DSP ICM Subroutine

Figure 15A:
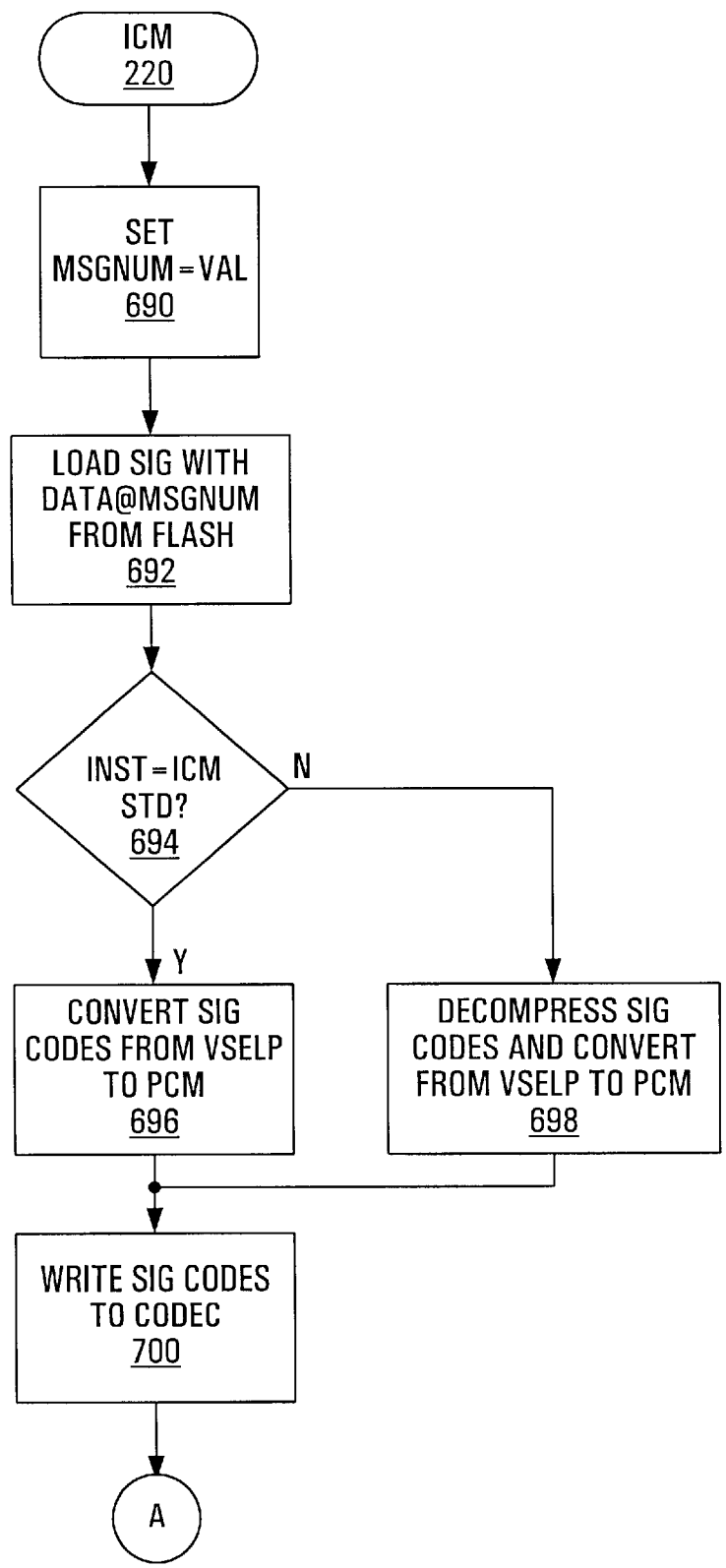
FIGS. 15a–15b are flowcharts describing an ICM subroutine stored in the DSP ROM for programming the DSP.
Figure 15B:
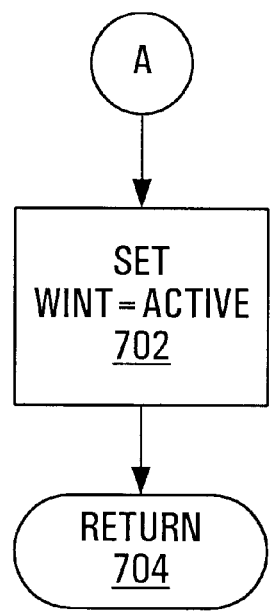

Referring now to FIG. 15, the DSP ICM subroutine 220 is illustrated. The ICM subroutine 220 directs the DSP microprocessor 90 in playing incoming messages that were previously recorded by the CPE circuit 10.

The ICM subroutine 220 begins with block 690, which directs the DSP microprocessor 90 to store in the DSP MSGNUM buffer 202 the value stored in the VAL buffer 209. The value was passed by the main microprocessor 20 to identify the message to be played. Block 692 then directs the DSP microprocessor 90 to load into the SIG buffer 92 the values stored in the DATA buffer 195 associated with the record 196 in the DSP MSG buffer 194 indexed by the value stored in the DSP MSGNUM buffer 202.

In other words, block 692 directs the DSP microprocessor 90 to load into the SIG buffer 92 the values stored in the DATA buffer 195 between the starting address indicated by the SP element 198 and the ending address indicated by the EP element 200, both elements being indexed by the value stored in the DSP MSGNUM buffer 202.

Block 694 then directs the DSP microprocessor 90 to compare the value stored in the INST buffer 207 with the value stored in the mnemonic constant ICMSTD 232. If the values match, then the message to be played has not been compressed and block 696 directs the DSP microprocessor 90 to convert the data stored in the SIG buffer 92 from VSELP coding to PCM coding.

Alternatively, the message to be played has been compressed and block 698 directs the DSP microprocessor 90 to first decompress the data stored in the SIG buffer 92 and then to convert it from VSELP coding to PCM coding.

In either case, block 700 directs the DSP microprocessor 90 to successively write the values stored in the SIG buffer 92 to the CODEC 38. Block 702 then directs the DSP microprocessor 90 to store in the WINT port 110 the value stored in the mnemonic constant ACTIVE to signify that the required message has been played, and block 704 directs the DSP microprocessor 90 to return to the calling routine.

Thus, the DSP microprocessor 90, as programmed by the codes stored in the DSP ROM 88, acts as a processor for and retrieving means for retrieving a coded representation of the voice message to play the voice message to a user.

DSP COMPRESS Subroutine

Figure 16A:
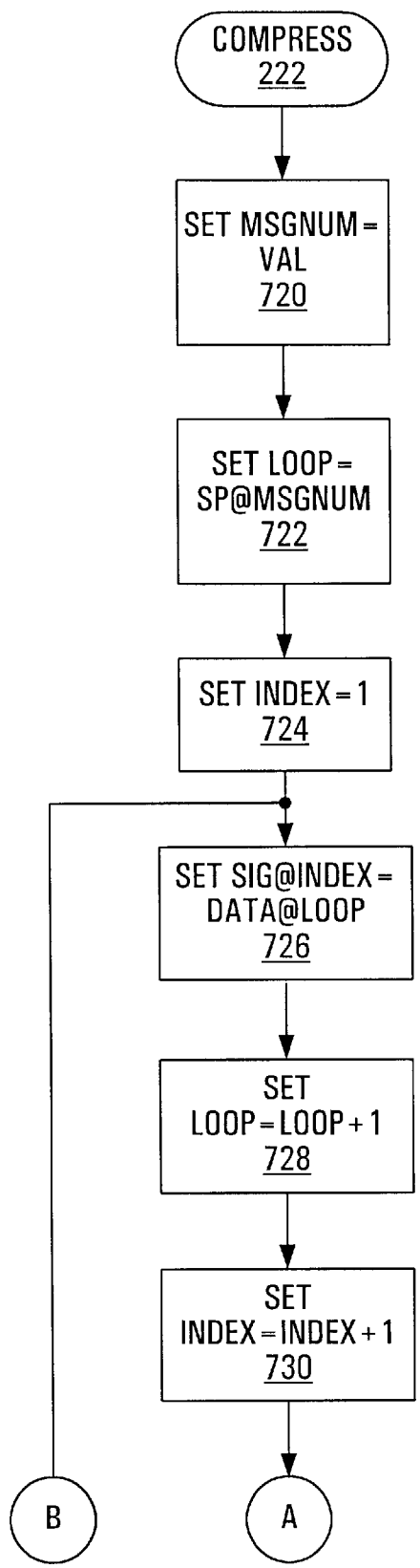
FIGS. 16a–16c are flowcharts describing a COMPRESS subroutine stored in the DSP ROM for programming the DSP.
Figure 16B:
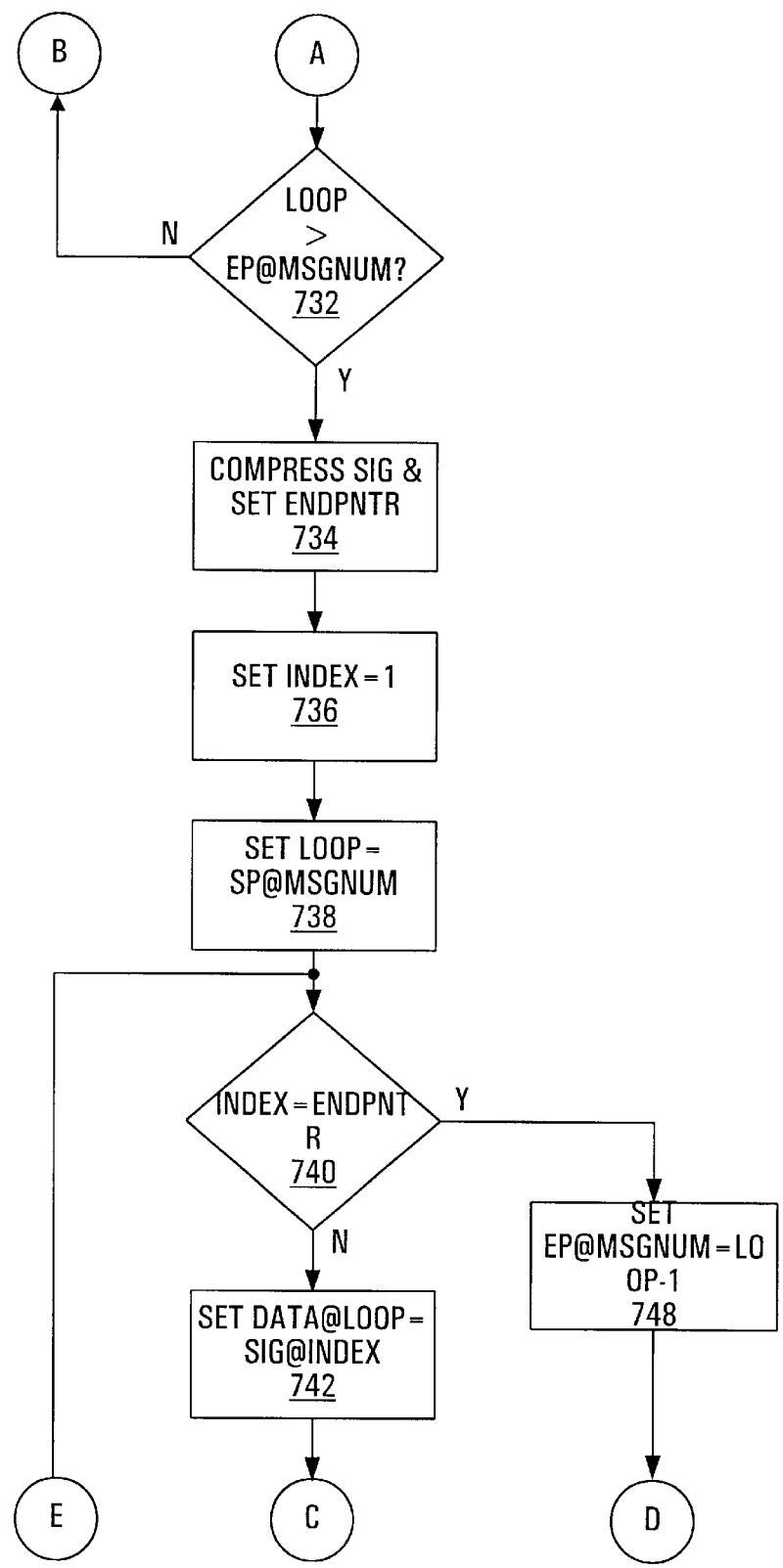
Figure 16C:
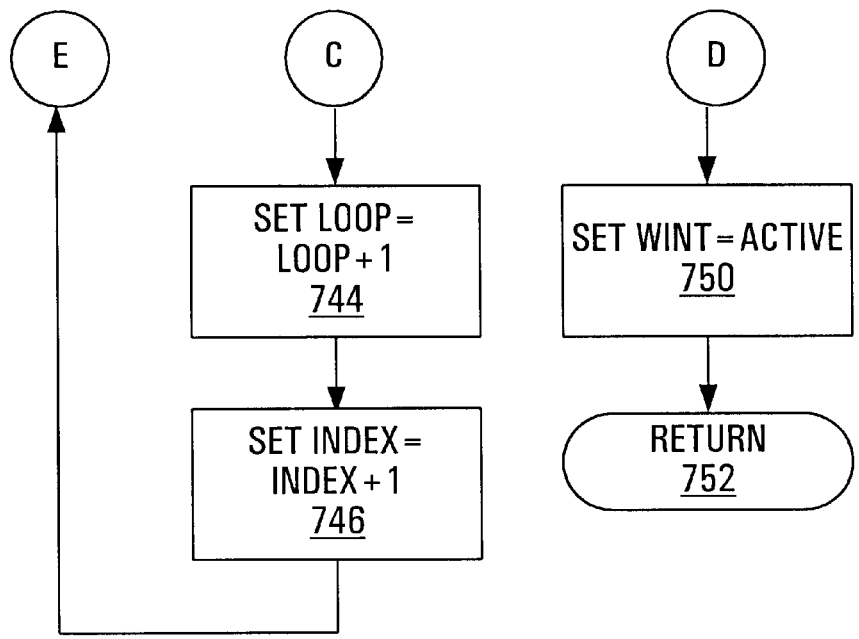

Referring now to FIG. 16, the DSP COMPRESS subroutine 222 is illustrated. The COMPRESS subroutine 222 directs the DSP microprocessor 90 in compressing the messages stored in the DSP FLASH 84 in the DATA buffer 195.

The COMPRESS subroutine 222 begins with block 720, which directs the DSP microprocessor 90 to store in the DSP MSGNUM buffer 202 the value stored in the VAL buffer 209, being the number of the message that the main microprocessor 20 requires compressed.

Block 722 then directs the DSP microprocessor 90 to store in the LOOP buffer 206 the value stored in the SP element 198 indexed by the value stored in the DSP MSGNUM buffer 202, to initialize a loop to sequentially select each of the samples stored in the DATA buffer 195 and that collectively comprise the selected message.

Block 724 directs the DSP microprocessor 90 to store in the INDEX buffer 208 the value one to initialize a loop to sequentially select each of the locations in the SIG buffer 92.

Block 726 then directs the DSP microprocessor 90 to store in the SIG buffer 92 as indexed by the INDEX buffer 208 the value stored in the DATA buffer 195 as indexed by the LOOP buffer 206.

Block 728 directs the DSP microprocessor 90 to increment the value stored in the LOOP buffer 206. Similarly, block 730 directs the DSP microprocessor 90 to increment the value stored in the INDEX buffer 208.

Block 732 directs the DSP microprocessor 90 to determine whether the value stored in the LOOP buffer 206 is greater than the value stored in the EP element 200 as indexed by the value stored in the DSP MSGNUM buffer 202. If not, then the DSP microprocessor 90 is directed back to block 726 to finish loading the SIG buffer 92 with the samples of the selected message.

Alternatively, if the value stored in the LOOP buffer 206 is greater than the value stored in the DSP MSGNUM buffer 202, then all the samples of the selected message have been loaded into the SIG buffer 92 and block 734 directs the DSP microprocessor 90 to compress the data stored in the SIG buffer 92 and store in the ENDPNTR buffer 204 the SIG buffer 92 address of the last compressed value. This compression operation may be performed according to any one of many known methods.

Thus, the DSP microprocessor 90, as programmed by the codes stored in the DSP ROM 88, acts as a processor for and compressing means for compressing a coded representation of a voice message after the coded representation has been retrieved to produce a compressed representation of the voice message having lesser size than the coded representation.

Block 736 directs the DSP microprocessor 90 to store in the INDEX buffer 208 the value one and block 738 directs the DSP microprocessor 90 to store in the LOOP buffer 206 the value stored in the SP element 198 as indexed by the value stored in the DSP MSGNUM buffer 202. These steps re-initiate two loop indices respectively to point to the beginning of the SIG buffer 92 and to the memory space in the DATA buffer 195 currently allocated to the selected record.

Block 740 directs the DSP microprocessor 90 to compare the value stored in the INDEX buffer 208 with the value stored in the ENDPNTR buffer 204. If the values are not equal, then not all of the compressed message samples have been re-stored into the DSP FLASH 84 and block 742 directs the DSP microprocessor 90 to store in the DATA buffer 195 as indexed by the value stored in the LOOP buffer 206 the value stored in the SIG buffer 92 as indexed by the value stored in the INDEX buffer 208 to store the next sequentially selected sample in the SIG buffer 92 into the next sequentially selected location in the DATA buffer 195.

Block 744 then directs the DSP microprocessor 90 to increment the value stored in the LOOP buffer 206 and block 746 directs the DSP microprocessor 90 to increment the value stored in the INDEX buffer 208 before directing the DSP microprocessor 90 back to block 740 to re-execute the loop code.

Alternatively, if at block 740 the value stored in the INDEX buffer 208 is equal to the value stored in the ENDPNTR buffer 204, then the whole compressed selected message has been re-stored into the DATA buffer 195 and block 748 directs the DSP microprocessor 90 to store in the EP element 200 as indexed by the value stored in the DSP MSGNUM buffer 202 the value stored in the LOOP buffer 206 less one, being the end address in the DATA buffer 195 of the newly compressed selected message.

Thus, the DSP microprocessor 90, as programmed by the codes stored in the DSP ROM 88, acts as resizing means for resizing and as a processor programmed to resize the block of memory to approximately the size of the compressed representation. It should be noted that the DSP microprocessor 90, as programmed by the codes stored in the DSP ROM 88, acts as adjusting means for adjusting and as a processor programmed to adjust at least one of the location attributes after compressing an associated coded representation, to define a block of memory of reduced size.

Block 750 then directs the DSP microprocessor 90 to store in the WINT port 110 the value stored in the mnemonic constant ACTIVE 250 to signify that the compress operation has concluded. Thereafter, block 752 directs the DSP microprocessor 90 to return to the calling routine. Thus, the DSP microprocessor 90, as programmed by the codes stored in the DSP ROM 88, acts as a processor for and second storing means for storing the compressed representation of the voice message in the block of memory in place of the coded representation.

DSP DELETE Subroutine

Figure 17A:
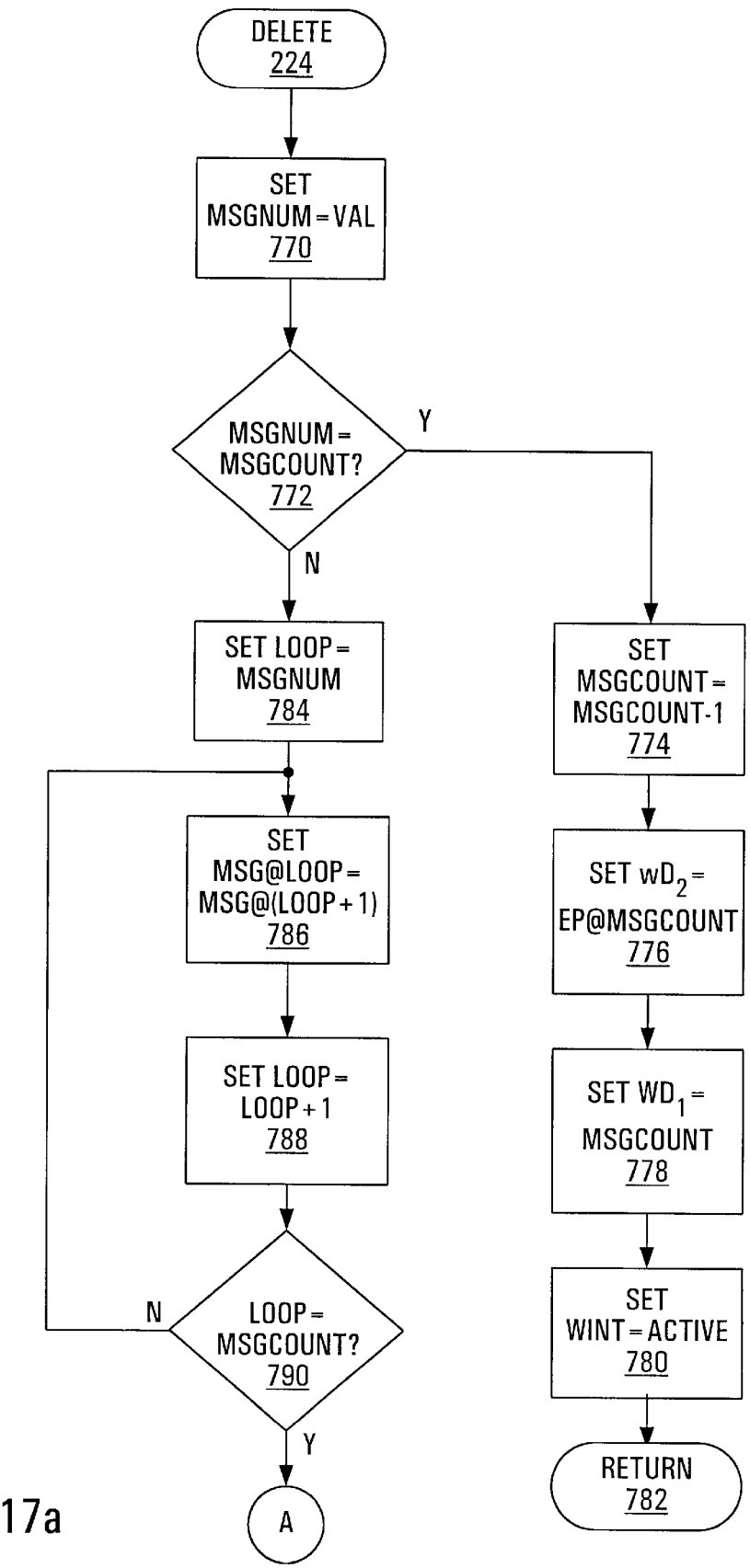
FIGS. 17a–17b are flowcharts describing a DELETE subroutine stored in the DSP ROM for programming the DSP.
Figure 17B:
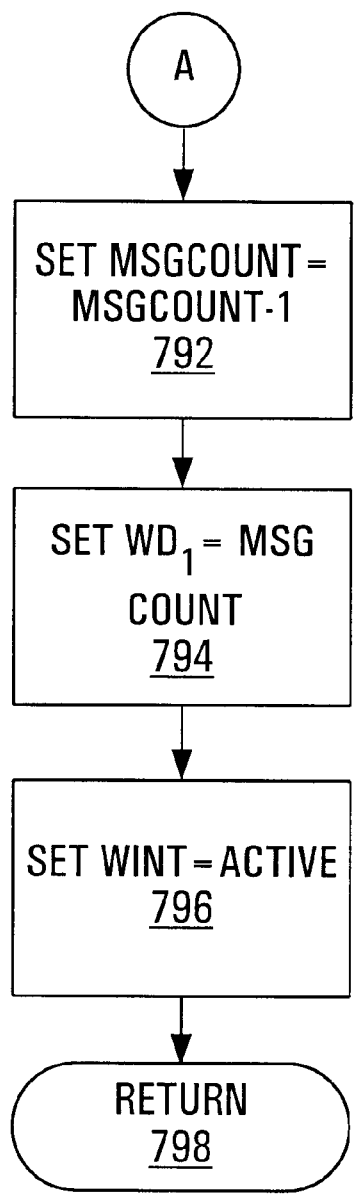

Referring now to FIG. 17, the DSP DELETE subroutine 224 is illustrated. The DELETE subroutine 224 directs the DSP microprocessor 90 in deleting a message selected by the main microprocessor 20. The DELETE subroutine 224 begins with block 770 which directs the DSP microprocessor 90 to store in the DSP MSGNUM buffer 202 the value stored in the VAL buffer 209, being the number of the message selected by the main microprocessor 20.

Block 772 then directs the DSP microprocessor 90 to compare the value stored in the DSP MSGNUM buffer 202 with the value stored in the DSP MSGCOUNT buffer 192. If the values are equal, then the message to be deleted is the last one recorded, which is the last one in the DSP MSG buffer 194 and the DATA buffer 195, and block 774 directs the DSP microprocessor 90 to decrement the value stored in the DSP MSGCOUNT buffer 192.

Block 776 then directs the DSP microprocessor 90 to store in the WD2 port 106 the value stored in the EP element 200 indexed by the value stored in the DSP MSGCOUNT buffer 192, which step has the effect of reclaiming the portion of the DATA buffer 195 used by the deleted message.

Block 778 then directs the DSP microprocessor 90 to store in the WD1 port 102 the value stored in the DSP MSG-COUNT buffer 192, being the newly reduced message count. Block 780 directs the DSP microprocessor 90 to store in the WINT buffer 110 the value stored in the mnemonic constant ACTIVE 250 to invoke an interrupt signalling the completion of the delete operation. Block 782 directs the DSP microprocessor 90 to return to the calling routine.

Alternatively, if at block 772 the values stored in the DSP MSGNUM buffer 202 and the DSP MSGCOUNT buffer 192 are not equal, then a record other than the last record recorded has been selected for deletion and block 784 directs the DSP microprocessor 90 to store in the LOOP buffer 206 the value stored in the DSP MSGNUM buffer 202 to initialize a loop to shift all records stored subsequent to the deleted record one position earlier in the DSP MSG buffer 194.

Block 786 then directs the DSP microprocessor 90 to store in the DSP MSG buffer 194 indexed by the value stored in the LOOP buffer 206 the value (being the whole record 196) stored in the DSP MSG buffer 194 indexed by one more than the value stored in LOOP buffer 206. Block 788 then directs the DSP microprocessor 90 to increment the value stored in the LOOP buffer 206.

Block 790 directs the DSP microprocessor 90 to determine whether the value stored in the LOOP buffer 206 is equal to the value stored in the DSP MSGCOUNT buffer 192. If not, then the DSP is directed back to block 786 to continue shifting records in the DSP MSG buffer 194.

Alternatively, the value stored in the LOOP buffer 206 is equal to the value stored in the DSP MSGCOUNT buffer 192, then all necessary records in the DSP MSG buffer 194 have been shifted to close the deletion gap and block 792 directs the DSP microprocessor 90 to decrement the value stored in the DSP MSGCOUNT buffer 192 to reflect such deletion.

Block 794 then directs the DSP microprocessor 90 to store in the WD1 port 102 the value stored in the DSP MSG-COUNT buffer 192. Block 796 directs the DSP microprocessor 90 to store in the WINT port 110 the value stored in the mnemonic constant ACTIVE to invoke an interrupt signalling the completion of the delete operation and block 798 directs the DSP microprocessor 90 to return to the calling routine.

DSP DEFRAG Subroutine

Figure 18A:
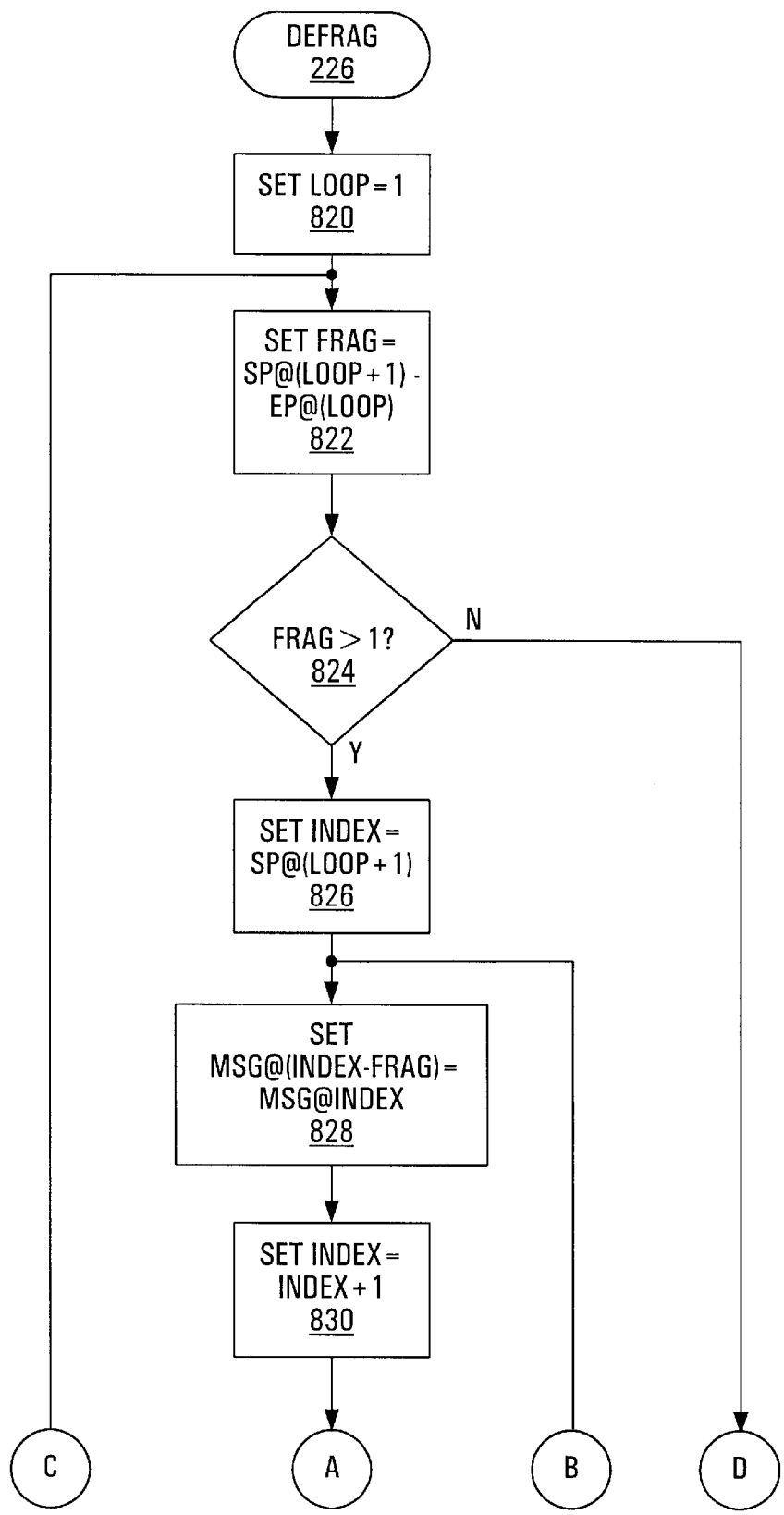
FIGS. 18a–18c are flowcharts describing a DEFRAG subroutine stored in the DSP ROM for programming the DSP.
Figure 18B:
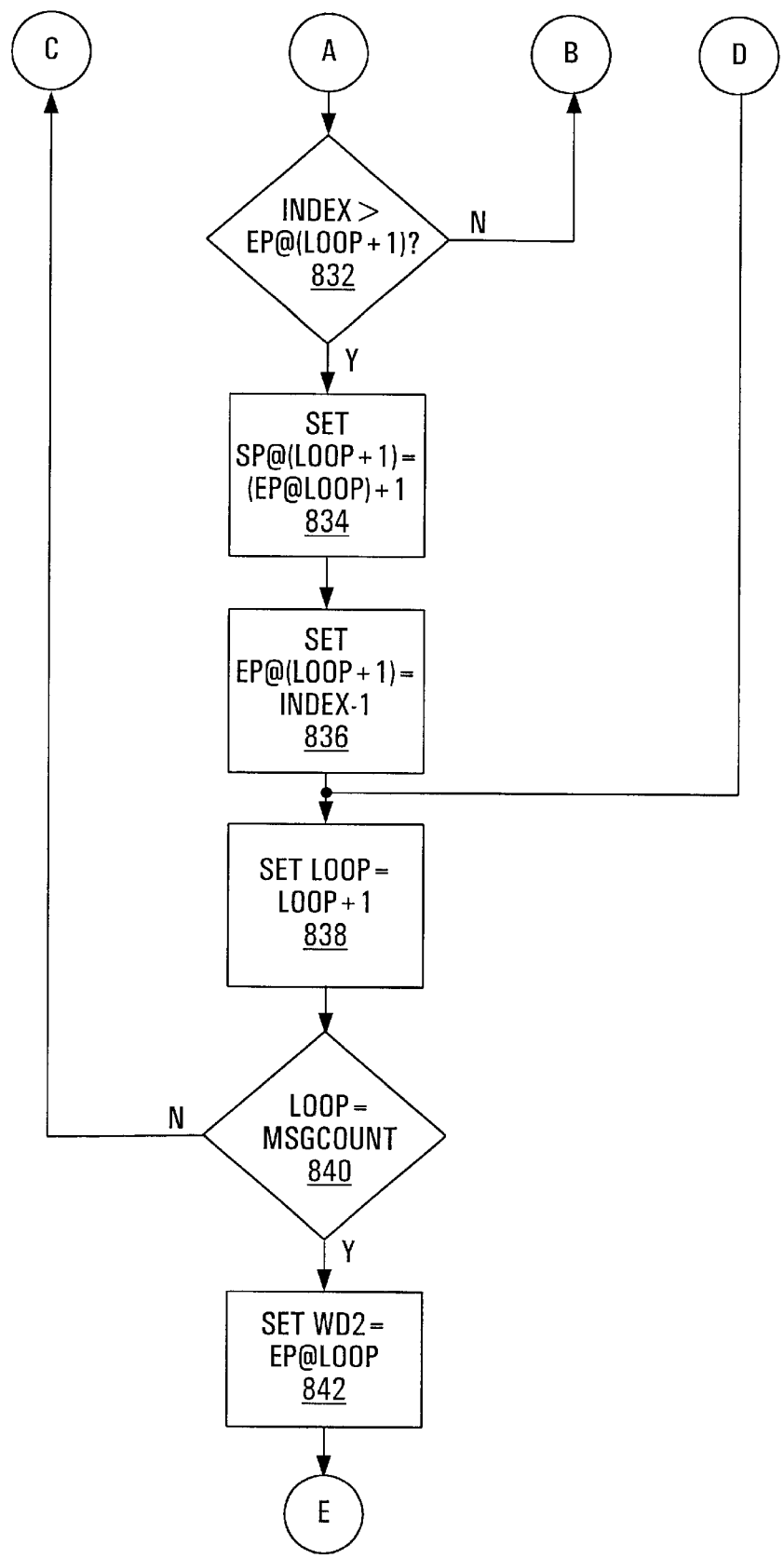
Figure 18C:
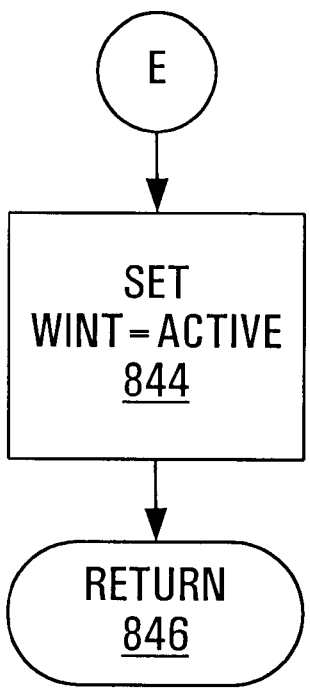

Referring now to FIG. 18, the DSP DEFRAG subroutine 226 is illustrated. The DEFRAG subroutine 226 directs the DSP microprocessor 90 in reducing the fragmentation of the DATA buffer 195 in the DSP FLASH 84 caused by message deletion and compression.

Thus, the DSP microprocessor 90, as programmed by the codes stored in the DSP ROM 88, acts as adjusting means for adjusting and as a processor programmed to adjust at least one of the location attributes of blocks of memory subsequent to the block of memory of reduced size to maintain the blocks of memory contiguous.

The DEFRAG subroutine 226 begins with block 820 which directs the DSP to store in the LOOP buffer 206 the value one to initialize a loop to step through each record 196 in the arrayed DSP MSG buffer 194.

Block 822 then directs the DSP microprocessor 90 to store in the FRAG buffer 205 the difference between the value stored in the EP element 200 indexed by the value stored in the LOOP buffer 206 subtracted from the value stored in the SP element 198 indexed by one more than the value stored in the LOOP buffer 206.

Block 824 directs the DSP microprocessor 90 to determine whether the value stored in the FRAG buffer 205 is greater than one, which would indicate fragmentation because there exists a gap between messages stored in the DATA buffer 195. If not, then the DSP microprocessor 90 is directed forward to block 838 which will be discussed below.

Alternatively, if the value stored in the FRAG buffer 205 is greater than one, then block 826 directs the DSP microprocessor 90 to store in the INDEX buffer 208 the value stored in the SP element 198 as indexed by one more than the value stored in the LOOP buffer 206. This step initializes a loop index to the address in the DATA buffer 195 of the beginning of the message that immediately follows the detected fragmentation gap.

Block 828 then directs the DSP microprocessor 90 to store in the DATA buffer 195 as indexed by the difference between the value stored in the FRAG buffer 205 subtracted from the value stored in the INDEX buffer 208, the value stored in the DATA buffer 195 as indexed by the value stored in the INDEX buffer 208. This step shifts the message sample stored immediately after the detected fragmentation gap to the location in the DATA buffer 195 immediately before the fragmentation gap.

Block 830 then directs the DSP microprocessor 90 to increment the value stored in the INDEX buffer 208. Block 832 directs the DSP microprocessor 90 to determine whether the value stored in the INDEX buffer 208 is greater than the value stored in the EP element 200 as indexed by one more than the value stored in the LOOP buffer 206 which would indicate that all message samples previously stored after the fragmentation gap have all been shifted to locations before the fragmentation gap. If not, then the DSP microprocessor 90 is directed back to block 828 to continue shifting message samples.

Alternatively, if the value stored in the INDEX buffer 208 is greater than the value stored in the EP element 200 as indexed by one more than the value stored in the LOOP buffer 206, then block 834 directs the DSP microprocessor 90 to store in the SP element 198 as indexed by one more than the value stored in the LOOP buffer 206, one more than the value stored in the EP element 200 as indexed by the value stored in the LOOP buffer 206. Similarly, block 836 directs the DSP microprocessor 90 to store in the EP element as indexed by one more than the value stored in the LOOP buffer 206, one less than the value stored in the INDEX buffer 208. These steps recalibrate the record beginning and end pointers to the new location of the message samples in the DATA buffer 195.

Block 838 then directs the DSP microprocessor 90 to increment the value stored in the LOOP buffer 206. Blocks 840 directs the DSP microprocessor 90 to determine whether the value stored in the LOOP buffer 206 is equal to the value stored in the DSP MSGCOUNT buffer 192, which would indicate that all records have been checked for fragmentation. If not, then the DSP microprocessor 90 is directed back to block 822 to continue the search for fragmentation between records.

Alternatively, if the value stored in the LOOP buffer 206 is equal to the value stored in the DSP MSGCOUNT buffer 192, then block 842 directs the DSP microprocessor 90 to store in the WD2 port 106 the value stored in the EP element 200 as indexed by the value stored in the LOOP buffer 206. This step passes to the main microprocessor 20 the last used address in the DATA buffer 195 so that available recording time call be calculated and stored in the FREE buffer 122.

Block 844 then directs the DSP microprocessor 90 to store in the WINT port 110 the value stored in the mnemonic constant ACTIVE 250 to invoke an interrupt to signal that the defragmentation operation has been completed. Block 846 then directs the DSP microprocessor 90 to return to the calling routine.

ALTERNATIVES

Figure 19:
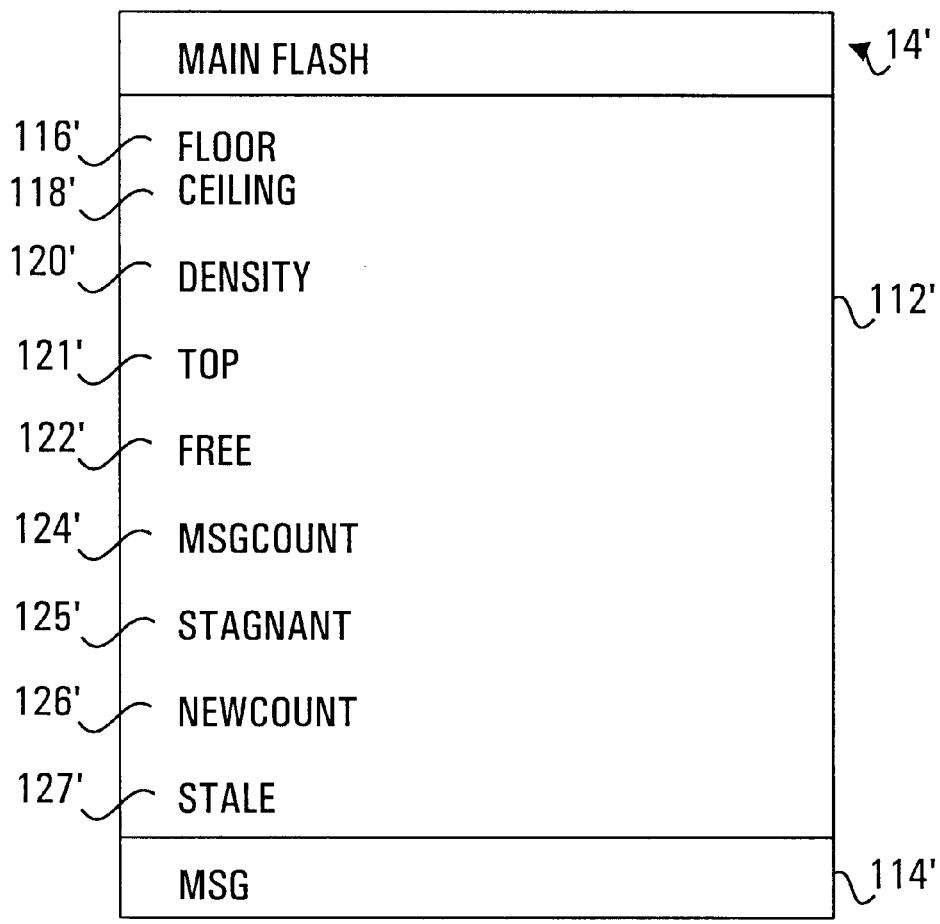
FIG. 19 is a memory structure diagram of a section of a first alternate non-volatile memory ("first alternate main FLASH") associated with the microprocessor according to a second embodiment of the invention.

Referring now to FIG. 19, a section of a first alternate main FLASH is generally illustrated at 14' according to a second embodiment of the invention. The first alternate main FLASH 14' is identical to the main FLASH 14 except that it further includes a STALE buffer 127'.

The STALE buffer 127' may be loaded with codes representing a time interval. In this embodiment, the STALE buffer 127' is loaded with a value representing a time interval measured from a message's recording time after which the message will be considered stale and therefore appropriate for compression if it has not yet been played.

Figure 20:
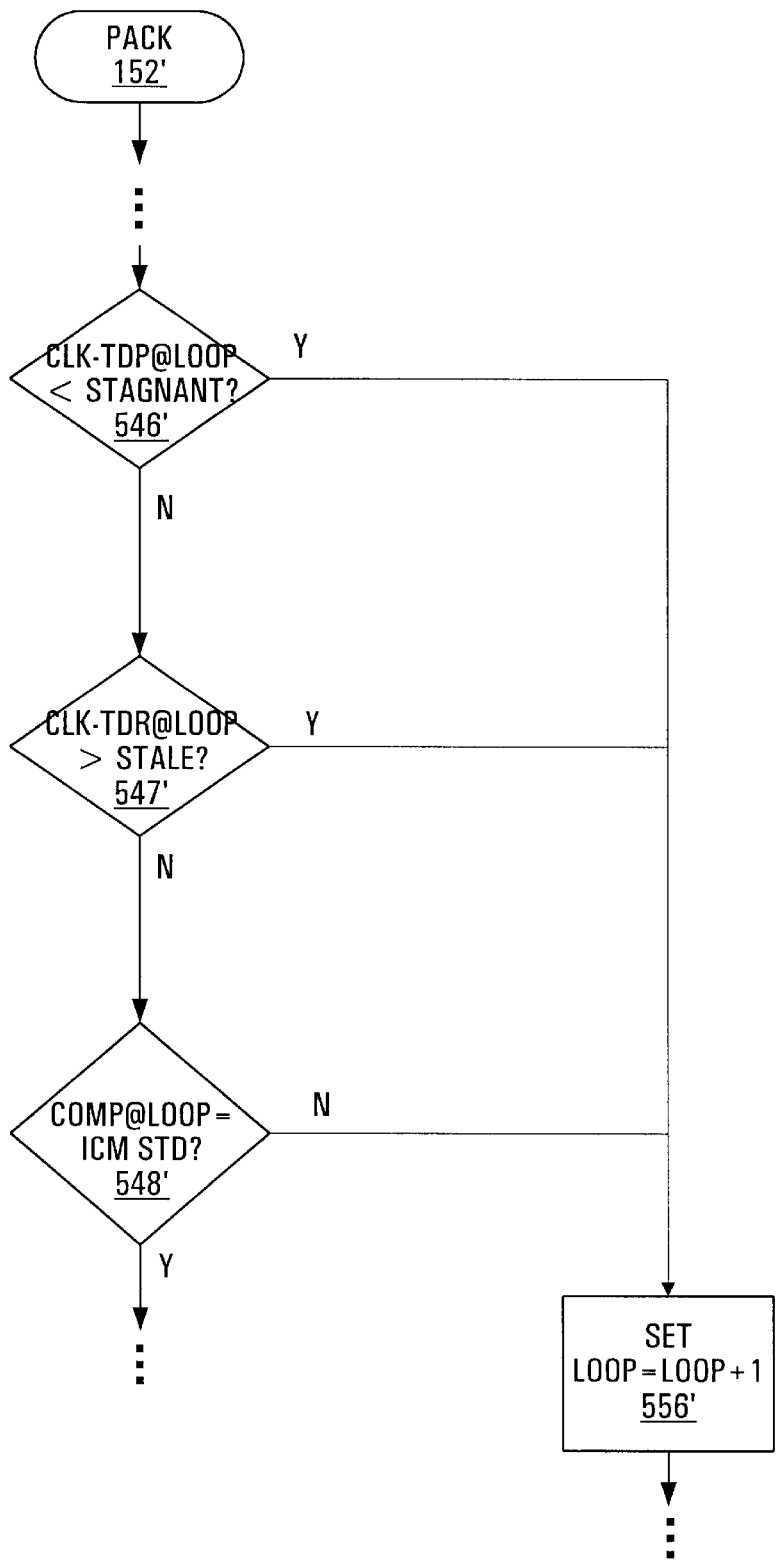
FIG. 20 is a flowchart diagram of a section of a first alternate PACK subroutine stored in the microprocessor ROM for programming the microprocessor according to the second embodiment of the invention.

Referring now to FIG. 20, a section of a first alternate PACK program according to a second embodiment of the invention is generally illustrated at 152'. The first alternate PACK program 152' is identical to the PACK program 152 except that it further includes a block 547' inserted between blocks 546, 548, and 556.

In operation, block 546' directs the main microprocessor 20 to determine whether the TDP element 132 indexed by the value in the LOOP buffer 140 is equal to 0. If so then the associated message in the main MSG buffer 114 has not yet been played and the main microprocessor 20 is directed to block 547'.

Block 547' directs the main microprocessor 20 to determine whether the difference between the TDR element 130 indexed by the value in the LOOP buffer 140 subtracted from the value currently stored in the CLK register 76 is greater than the value stored in the STALE buffer 127'.

If so, then the associated message is judged stale and the main microprocessor 20 is directed to block 548' to further analyze the compression of the stale message.

Alternatively, the main microprocessor 20 is directed to block 556' to begin analyzing the compressibility of the subsequent record.

Thus the main microprocessor 20, as programmed by the codes stored in the main ROM 18, acts as attribute setting means for setting the time attribute when the coded representation is stored and increments the time attribute to reflect time elapsed since the coded representation was stored.

In other words, the main microprocessor 20, as programmed by the codes stored in the main ROM 18, acts as a processor programmed to set the time attribute when the coded representation is stored and to adjust the time attribute to reflect time elapsed since the coded response was stored.

It should also be noted that the main microprocessor 20, as programmed by the codes stored in the main ROM 18, acts as a processor programmed to compress the coded representation when the time attribute is greater than a predefined time value, and to set the compressed attribute active after compressing.

Put another way, the main microprocessor 20, as programmed by the codes stored in the main ROM 18, acts compressing means for compressing the coded representation activated when the time attribute is greater than a predefined time value, and acts as attribute setting means for setting an attribute of the compressed attribute of the compressed representation in response to compressing the coded representation.

Figure 21:
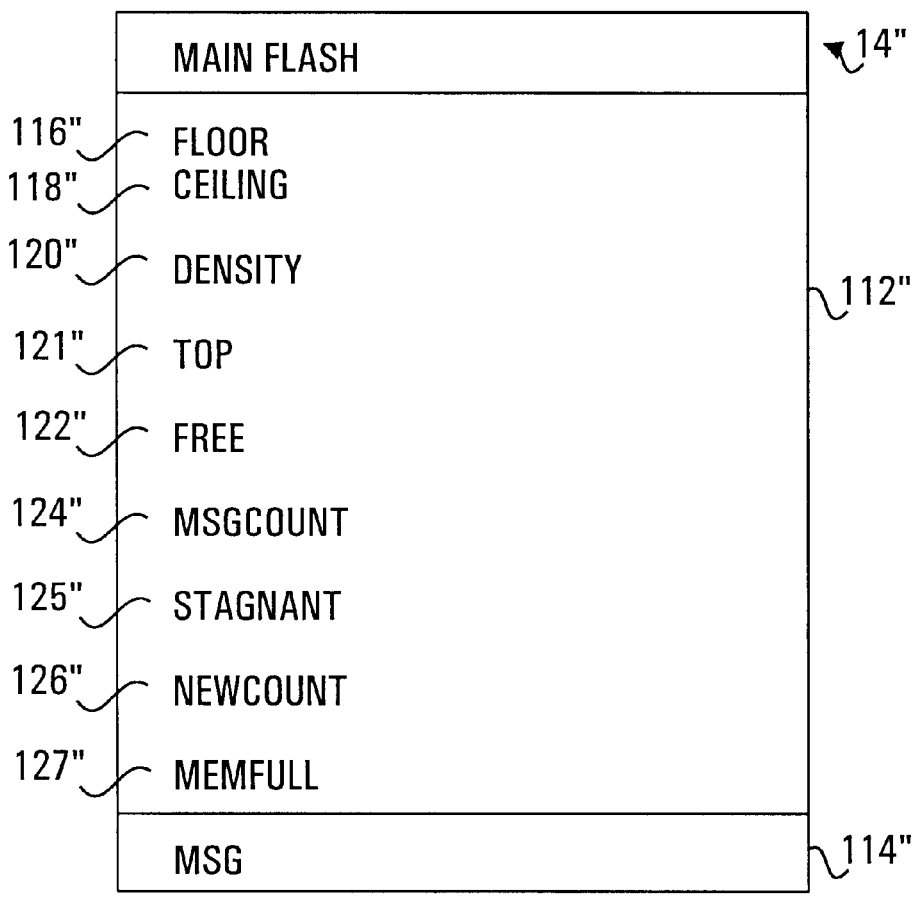
FIG. 21 is a memory structure diagram of a section of an alternate non-volatile memory ("second alternate main FLASH") associated with the microprocessor according to a third embodiment of the invention.

Referring now to FIG. 21, a section of a second alternate main FLASH is generally illustrated at 14" according to a third embodiment of the invention. The second alternate main FLASH 14" is identical to the main FLASH 14 except that it further includes a MEMFULL buffer 127".

The MEMFULL buffer 127" may be loaded with codes representing a memory address in the DSP FLASH 14". In this embodiment, the MEMFULL buffer 127" is loaded with a value representing a memory address within the DATA buffer 195, the memory address demarking the three-quarter-full point within the DATA buffer 195 so that the MEMFULL buffer 127" acts as a threshold.

Figure 22:
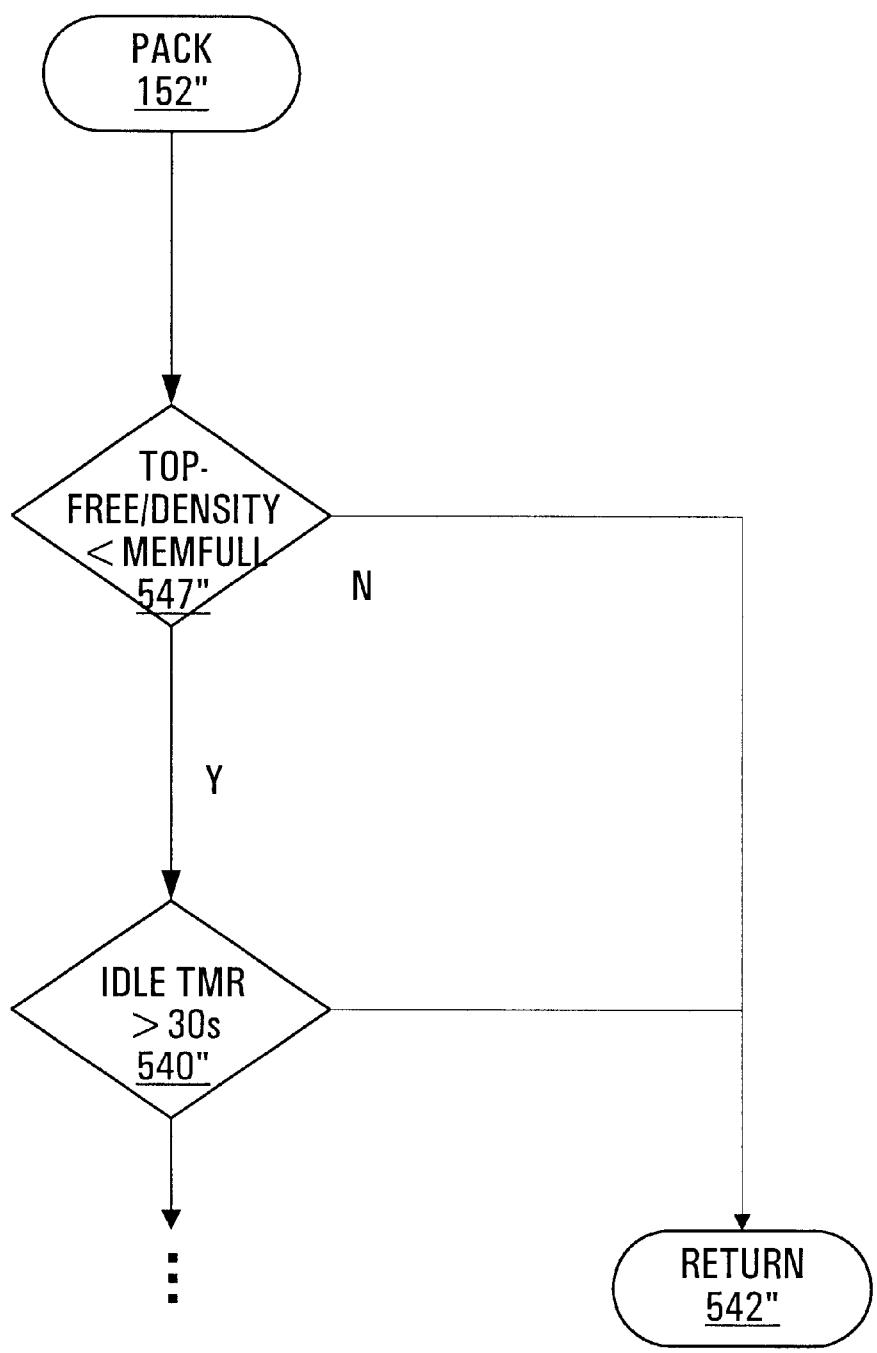
FIG. 22 is a flowchart diagram of a section of a second alternate PACK subroutine stored in the microprocessor ROM for programming the microprocessor according to the third embodiment of the invention.

Referring now to FIG. 22, a section of a second alternate PACK program according to a third embodiment of the invention is generally illustrated at 152". The second alternate PACK program 152" is identical to the PACK program 152 except that it further includes a block 547" inserted before block 540.

In operation, block 547" directs the main microprocessor 20 to determine whether the value stored in the FREE buffer 122 divided by the value stored in the DENSITY buffer 120 subtracted the value stored in the TOP buffer 121 is less than the value stored in the MEMFULL buffer 127".

If so, then the DATA buffer 195 is not yet approaching its storage capacity and block 542" directs the main microprocessor 20 to return to the calling routine.

Alternatively, the main microprocessor 20 is directed to block 540" to determine whether the CPE circuit 10 is sufficiently idle to begin a compression operation.

Thus, the main microprocessor 20, as programmed by the codes stored in the main ROM 18, acts as compressing means for compressing the coded representation of a voice message and a processor programmed to compress the coded representation of a voice message when the end point of the block of memory having the greatest end point value has a value greater than an predefined end point value.

The invention provides a way of storing a coded representation of a voice message in a block of memory associated with the voice message and sized to correspond to the size of the coded representation, of retrieving the coded representation to play the voice message to a user, of compressing the coded representation after it has been retrieved so as to produce a compressed representation having a lesser size than the coded representation, and of storing the compressed representation of the message in a smaller block of memory in place of the coded representation.

In various embodiments, compression is invoked according to whether a message has been played, whether a message is stagnant or stale, whether the buffer for storing messages is approaching its capacity, or whether the CPE is idle.

While specific embodiments of the invention have been described and illustrated, such embodiments should be considered illustrative of the invention only and not as limiting the invention as construed in accordance with the accompanying claims.

What is claimed is:

1. A method of storing a voice message, the method comprising the steps of:
    a) storing a coded representation of said voice message in a block of memory associated with said voice message and sized to correspond to the size of said coded representation;
    b) retrieving said coded representation to play said voice message to a user;
    c) compressing said coded representation automatically in response to a passage of a predetermined time period after the retrieving is completed to produce a compressed representation of said voice message, said compressed representation have a lesser size than said coded representation, after said coded representation has been retrieved; and
    d) storing said compressed representation of said message in said block of memory in place of said coded representation.

2. A method as claimed in claim 1 further including the step of resizing said block of memory to approximately the size of said compressed representation.

3. A method as claimed in claim 1 further including the step of associating a played attribute with said voice message, said played attribute indicating whether or not said coded representation has been retrieved.

4. A method as claimed in claim 3 further including the step of annunciating a representation of said played attribute to said user.

5. A method as claimed in claim 1 further including the step of associating a compressed attribute with said voice message, said compressed attribute indicating whether or not said message is represented by said compressed representation.

6. A method as claimed in claim 1 wherein the step of storing includes the step of associating a location attribute with said voice message, said location attribute identifying said block of memory at which said coded representation or said compressed representation is stored.

7. A method as claimed in claim 1 further including the step of associating with said voice message a time attribute identifying a time of storing said coded representation.

8. A method as claimed in claim 1 further including the step of storing a plurality of coded representations of respective voice messages in respective blocks of memory sized to correspond to respective said coded representations.

9. A method as claimed in claim 8 further including the step of resizing said respective blocks of memory associated with played voice messages, to approximately the sizes of respective compressed representations.

10. A method as claimed in claim 8 further including the step of storing said plurality of coded representations in respective blocks of memory in a predefined order.

11. A method as claimed in claim 10 further including the step of storing said plurality of coded representations in respective contiguous blocks of memory.

12. A method as claimed in claim 8 further including the step of associating with each of said respective voice messages, location attributes representing the beginning point and end point of each of said respective blocks of memory.

13. A method as claimed in claim 12 further including the step of adjusting at least one of said location attributes after compressing an associated coded representation, to define a block of memory of reduced size.

14. A method as claimed in claim 13 further including the step of adjusting said location attributes of blocks of memory subsequent to said block of memory of reduced size to maintain said blocks of memory contiguous.

15. A method as claimed in claim 14 further including the step of associating with each of said respective messages a time attribute representing a time at which said coded representation is stored, a compressed attribute representing whether or not said voice message is represented by a compressed representation and a played attribute representing whether or not said coded representation has been retrieved, said played attribute being set active when said coded representation is retrieved.

16. A method as claimed in claim 15 further including the step of compressing said coded representation when said played attribute is active and setting said compressed attribute active in response to compressing said coded representation.

17. A method as claimed in claim 16 further including the step of compressing when said end point of the block of memory having the greatest end point value has a value greater than a predefined end point value.

18. A method as claimed in claim 15 further including the step of setting said time attribute when said coded representation is stored.

19. A method as claimed in claim 17 further including the step of compressing when said time attribute is greater than a predefined time value, and setting said compressed attribute active in response to compressing said coded representation.

20. A method as claimed in claim 1 further including the step of receiving said voice message from a telephone line.

21. An apparatus for storing a voice message, the apparatus comprising:
   a) memory operable to be divided into variable sized blocks;
   b) first storing means for associating a block of memory with said voice message and for storing a coded representation of said voice message in said block of memory and for sizing said block of memory to correspond to the size of said coded representation;
   c) retrieving means for retrieving said coded representation to play said voice message to a user;
   d) compressing means for compressing said coded representation automatically in response to passage of a predetermined time period after said coded representation has been retrieved to produce a compressed representation of said voice message, said compressed representation having lesser size than said coded representation; and
   e) second storing means for storing said compressed representation of said message in said block of memory in place of said coded representation.

22. An apparatus as claimed in claim 21 further including resizing means for resizing said block of memory to approximately the size of said compressed representation.

23. An apparatus as claimed in claim 21 further including associating means for associating a played attribute with said voice message, said played attribute indicating whether or not said coded representation has been retrieved.

24. An apparatus as claimed in claim 23 further including annunciating means for annunciating a representation of said played attribute to said user.

25. An apparatus as claimed in claim 21 wherein said associating means associates a compressed attribute with said voice message, said compressed attribute indicating whether or not said message is represented by said compressed representation.

26. An apparatus as claimed in claim 21 wherein said associating means associates a location attribute with said voice message, said location attribute identifying said block of memory at which said coded representation or said compressed representation is stored.

27. An apparatus as claimed in claim 21 wherein said associating means associates with said voice message a time attribute identifying a time of storing said coded representation.

28. An apparatus as claimed in claim 21 wherein said storage means stores a plurality of coded representations of respective voice messages in respective blocks of memory sized to correspond to respective said coded representations.

29. An apparatus as claimed in claim 28 further including resizing means for resizing said respective blocks of memory associated with played voice messages, to approximately the respective sizes of respective compressed representations.

30. An apparatus as claimed in claim 28 wherein said first storing means stores said plurality of coded representations in respective blocks of memory in a predefined order.

31. An apparatus as claimed in claim 30 wherein said second storing means stores said plurality of coded representations in respective contiguous blocks of memory.

32. An apparatus as claimed in claim 28 further including associating means for associating with each of said respective voice messages, location attributes representing beginning and end points of each of said respective blocks of memory.

33. An apparatus as claimed in claim 32 further including adjusting means for adjusting at least one of said location attributes after an associated coded representation has been compressed, to define a block of memory of reduced size.

34. An apparatus as claimed in claim 33 wherein said adjusting means adjusts said location attributes of blocks of memory subsequent to said block of memory of reduced size, to maintain said blocks of memory contiguous.

35. An apparatus as claimed in claim 34 further including associating means for associating with each of said respective messages a time attribute representing a time at which said coded representation is stored, a compressed attribute representing whether or not said voice message is represented by a compressed representation and a played attribute representing whether or not said coded representation has been retrieved.

36. An apparatus as claimed in claim 35 further including attribute setting means for setting said played attribute active when said coded representation is retrieved.

37. An apparatus as claimed in claim 36 wherein said compressing means is activated when said played attribute is active and wherein said attribute setting means sets said compressed attribute active in response to compressing said coded representation.

38. An apparatus as claimed in claim 37 wherein said compressing means is activated when said end point of the block of memory having the greatest end point value has a value greater than a predefined end point value.

39. An apparatus as claimed in claim 36 wherein said attribute setting means sets said time attribute when said coded representation is stored and increments said time attribute to reflect time elapsed since said coded representation was stored.

40. An apparatus as claimed in claim 39 wherein said compressing means is activated when said time attribute is greater than a predefined time value, and wherein said attribute setting means sets said compressed attribute in response to compressing said coded representation.

41. An apparatus as claimed in claim 21 further including means for receiving said voice message from a telephone line and for providing said voice message to said storage means.

42. An apparatus for storing a voice message, the apparatus comprising:
   a) memory operable to be divided into various sized blocks; and
   b) a processor for
      i) associating a block of memory with said voice message and for storing a coded representation of said voice message in said block of memory and for sizing said block of memory to correspond to the size of said coded representation;
      ii) retrieving said coded representation to play said voice message to a user;

iii) compressing said coded representation automatically in response to passage of a predetermined time period after said coded representation has been retrieved to produce a compressed representation of said voice message, having lesser size than said coded representation; and iv) storing said compressed representation of said message in said block of memory in place of said coded representation.

43. An apparatus as claimed in claim 42 wherein said processor is programmed to resize said block of memory to approximately the size of said compressed representation.

44. An apparatus as claimed in claim 42 wherein said processor is programmed to associate a played attribute with said voice message, said played attribute indicating whether or not said coded representation has been retrieved.

45. An apparatus as claimed in claim 44 further including an annunciator for annunciating a representation of said played attribute to said user.

46. An apparatus as claimed in claim 42 wherein said processor is programmed associate a compressed attribute with said voice message, said compressed attribute indicating whether or not said message is represented by said compressed representation.

47. An apparatus as claimed in claim 42 wherein said processor is programmed to associate a location attribute with said voice message, said location attribute identifying said block of memory at which said coded representation or said compressed representation is stored.

48. An apparatus as claimed in claim 42 wherein said processor is programmed to associate with said voice message a time attribute identifying a time of storing said coded representation.

49. An apparatus as claimed in claim 42 wherein said processor is programmed to store a plurality of coded representations of respective voice messages in respective blocks of memory and to size said blocks of memory to correspond to respective said coded representations.

50. An apparatus as claimed in claim 49 wherein said processor is programmed to resize said respective blocks of memory associated with played voice messages, to approximately said respective sizes of respective compressed representations.

51. An apparatus as claimed in claim 49 wherein said processor is programmed to store said plurality of coded representations in respective blocks of memory in a predefined order.

52. An apparatus as claimed in claim 51 wherein said processor is programmed to store said plurality of coded representations representing said messages in respective contiguous blocks of memory.

53. An apparatus as claimed in claim 49 wherein said processor is programmed to store a location attribute associator for associating with each of said respective voice messages, location attributes representing said beginning point and end point of each of said respective blocks of memory.

54. An apparatus as claimed in claim 53 wherein said processor is programmed to adjust at least one of said location attributes after compressing an associated coded representation, to define a block of memory of reduced size.

55. An apparatus as claimed in claim 54 wherein said processor is programmed to adjust said location attributes of blocks of memory subsequent to said block of memory of reduced size to maintain said blocks of memory contiguous.

56. An apparatus as claimed in claim 55 wherein said processor is programmed to associate with each of said respective messages a time attribute representing a time at which said coded representation is stored, a compressed attribute representing whether or not said voice message is represented by a compressed representation and a played attribute representing whether or not said coded representation has been retrieved.

57. An apparatus as claimed in claim 56 wherein said processor is programmed to set said played attribute active when said coded representation is retrieved.

58. An apparatus as claimed in claim 57 wherein said processor is programmed to compress said coded representation when said played attribute is active and to set said compressed attribute active after compressing said coded representation.

59. An apparatus as claimed in claim 58 wherein said processor is programmed to compress said coded representation when said end point of the block of memory having the greatest end point value has a value greater than a predefined end point value.

60. An apparatus as claimed in claim 58 wherein said processor is programmed to set said time attribute when said coded representation is stored and to adjust said time attribute to reflect time elapsed since said coded response was stored.

61. An apparatus as claimed in claim 60 wherein said processor is programmed to compress said coded representation when said time attribute is greater than a predefined time value, and to set said compressed attribute active after compressing.

62. An apparatus as claimed in claim 42 further including a receiver for receiving said voice message from a telephone line and for providing said voice message to said processor.

63. A processor readable storage medium on which is stored a plurality of processor readable codes for directing a processor to store a voice message by:

a) storing a coded representation of said voice message in a block of memory associated with said voice message and sized to correspond to the size of said coded representation;

b) retrieving said coded representation to play said voice message to a user;

c) compressing said coded representation automatically in response to passage of a predetermined time period after the retrieving is completed to produce a compressed representation of said voice message, said compressed representation having a lesser size than said coded representation; and d) storing said compressed representation of said message in said block of memory in place of said coded representation.

64. A processor readable storage medium as claimed in claim 63 further including codes operable to direct said processor to perform the step of resizing said block of memory to approximately the size of said compressed representation.

65. A processor readable storage medium as claimed in claim 63 further including codes operable to direct said processor to perform the step of associating a played attribute with said voice message, said played attribute indicating whether or not said coded representation has been retrieved.

66. A processor readable storage medium as claimed in claim 65 further including codes operable to direct said processor to perform the step of annunciating a representation of said played attribute to said user.

67. A processor readable storage medium as claimed in claim 63 further including codes operable to direct said processor to perform the step of associating a compressed attribute with said voice message, said compressed attribute indicating whether or not said message is represented by said compressed representation.

68. A processor readable storage medium as claimed in claim 63 further including codes operable to direct said processor to perform the step of associating a location attribute with said voice message, said location attribute identifying said block of memory at which said coded representation or said compressed representation is stored.

69. A processor readable storage medium as claimed in claim 63 further including codes operable to direct said processor to perform the step of associating with said voice message a time attribute identifying a time of storing said coded representation.

70. A processor readable storage medium as claimed in claim 63 further including codes operable to direct said processor to perform the step of storing a plurality of coded representations of respective voice messages in respective blocks of memory sized to correspond to respective said coded representations.

71. A processor readable storage medium as claimed in claim 70 further including codes operable to direct said processor to perform the step of associating with each of said respective voice messages, location attributes representing the beginning point and end point of each of said respective blocks of memory.

72. A processor readable storage medium as claimed in claim 71 further including codes operable to direct said processor to perform the step of adjusting at least one of said location attributes after compressing an associated coded representation, to define a block of memory of reduced size.

73. A processor readable storage medium as claimed in claim 72 further including codes operable to direct said processor to perform the step of adjusting said location attributes of blocks of memory subsequent to said block of memory of reduced size to maintain said blocks of memory contiguous.

74. A processor readable storage medium as claimed in claim 73 further including codes operable to direct said processor to perform the step of associating with each of said respective messages a time attribute representing a time at which said coded representation is stored, a compressed attribute representing whether or not said voice message is represented by a compressed representation and a played attribute representing whether or not said coded representation has been retrieved, said played attribute being set active when said coded representation is retrieved.

75. A processor readable storage medium as claimed in claim 74 further including codes operable to direct said processor to perform the step of compressing said coded representation when said played attribute is active and setting said compressed attribute active in response to compressing said coded representation.

76. A processor readable storage medium as claimed in claim 75 further including codes operable to direct said processor to perform the step of compressing when said end point of the block of memory having the greatest end point value has a value greater than a predefined end point value.

77. A processor readable storage medium as claimed in claim 74 further including codes operable to direct said processor to perform the step of setting said time attribute when said coded representation is stored.

78. A processor readable storage medium as claimed in claim 77 further including codes operable to direct said processor to perform the step of compressing when said time attribute is greater than a predefined time value, and setting said compressed attribute active in response to said compressing.

79. A processor readable storage medium as claimed in claim 70 further including codes operable to direct said processor to perform the step of resizing said respective blocks of memory associated with played voice messages, to approximately the sizes of corresponding compressed representations.

80. A processor readable storage medium as claimed in claim 70 further including codes operable to direct said processor to perform the step of storing said plurality of coded representations in respective blocks of memory in a predefined order.

81. A processor readable storage medium as claimed in claim 80 further including codes operable to direct said processor to perform the step of storing said plurality of coded representations representing said messages in respective contiguous blocks of memory.

82. A processor readable storage medium as claimed in claim 63 further including codes operable to direct said processor to perform the step of receiving said voice message from a telephone line.

\* \* \* \* \*